Figure 1:
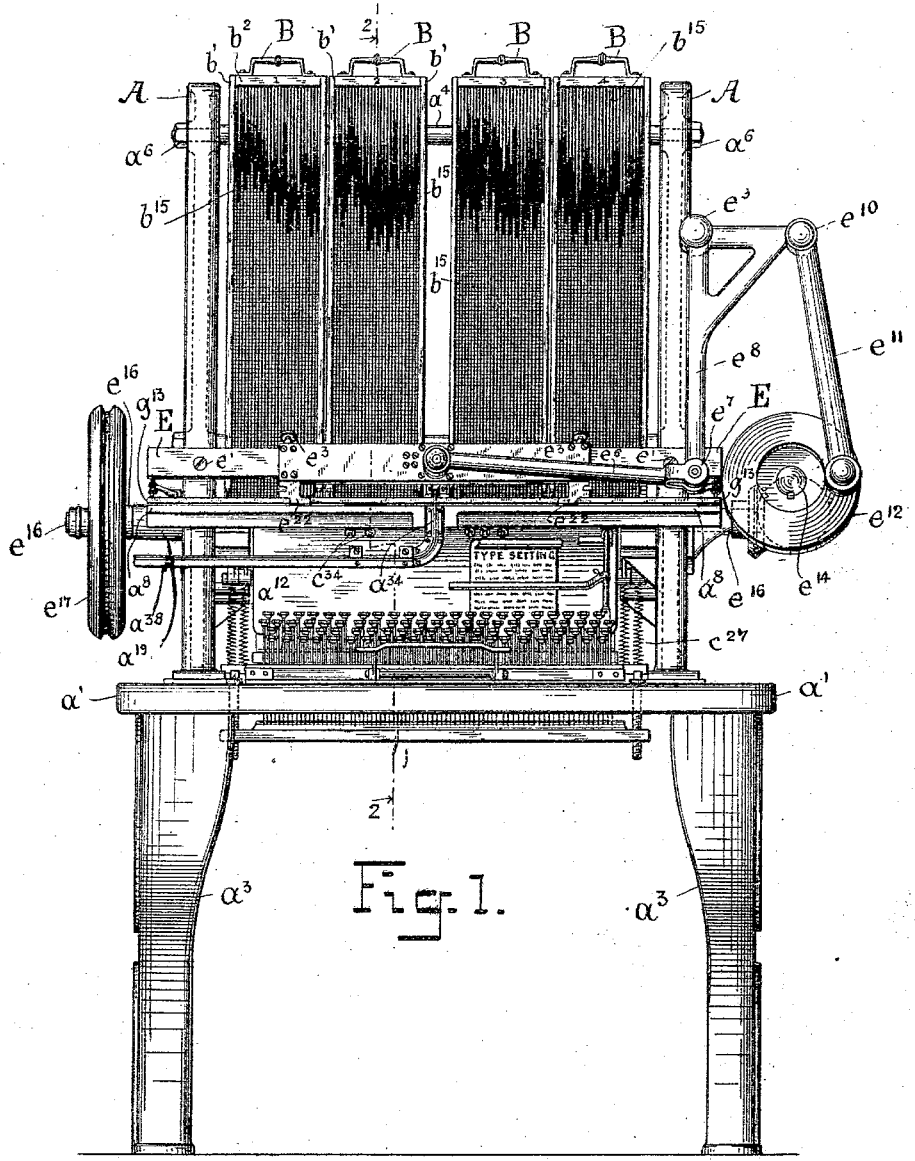

No. 637,858. Patented Nov. 28, 1899.
A. DOW.
TYPE SETTING MACHINE.
(Application filed July 31, 1896. Renewed Oct. 21, 1898.)
(No Model.) 14 Sheets—Sheet 1.

Witnesses
Chas. Hanimann
Emma H. Finlayson.

Alexander Dow
Inventor
By his Attorneys

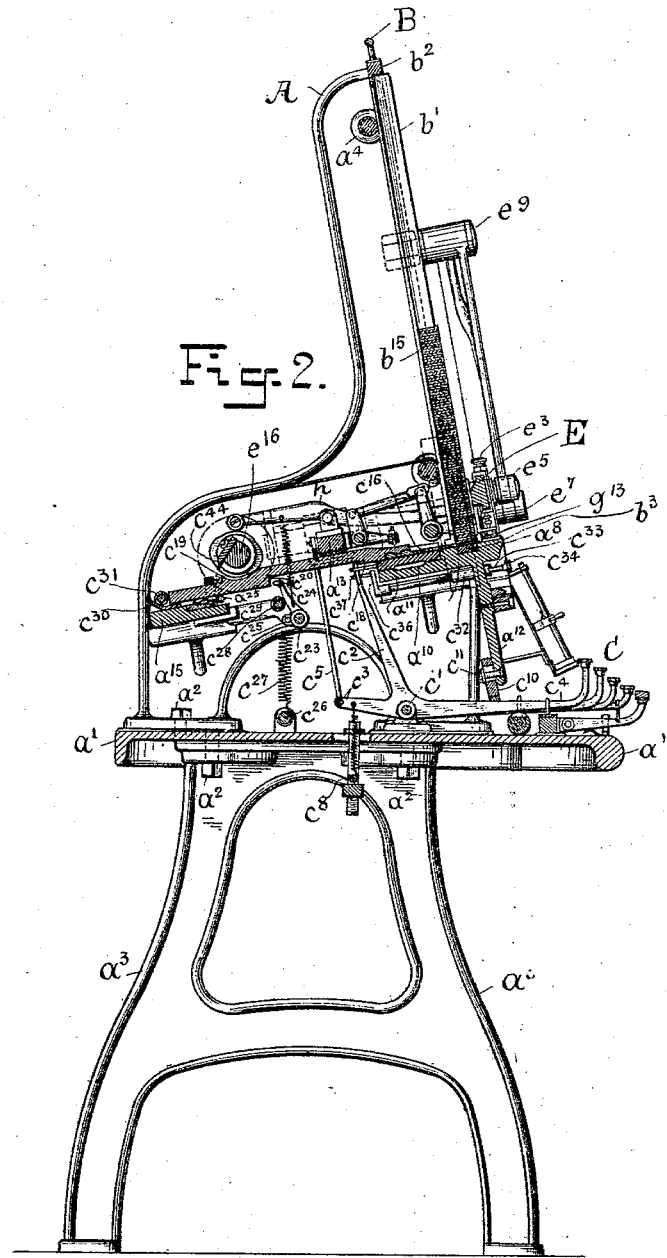

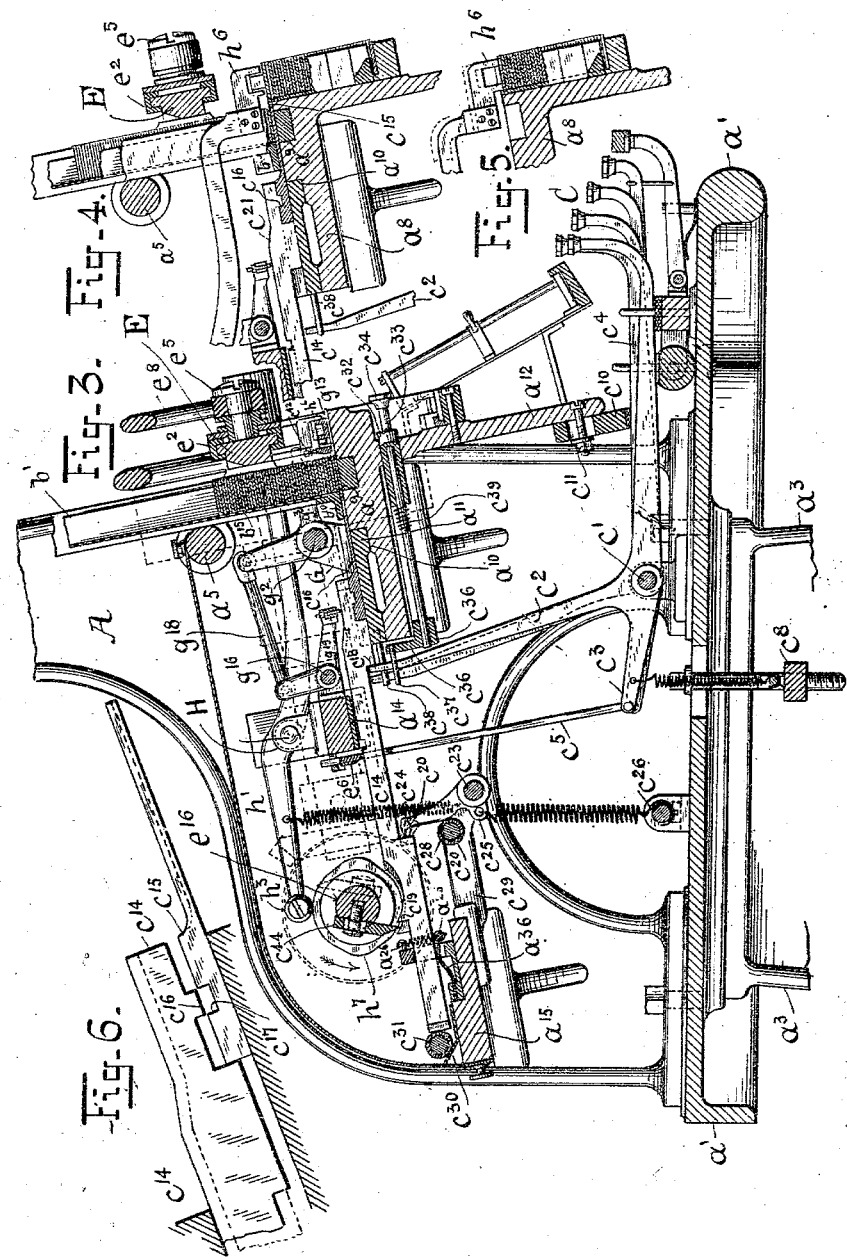

No. 637,858. Patented Nov. 28, 1899.
A. DOW.
TYPE SETTING MACHINE.
(Application filed July 31, 1896. Renewed Oct. 21, 1898.)
(No Model.) 14 Sheets—Sheet 4.
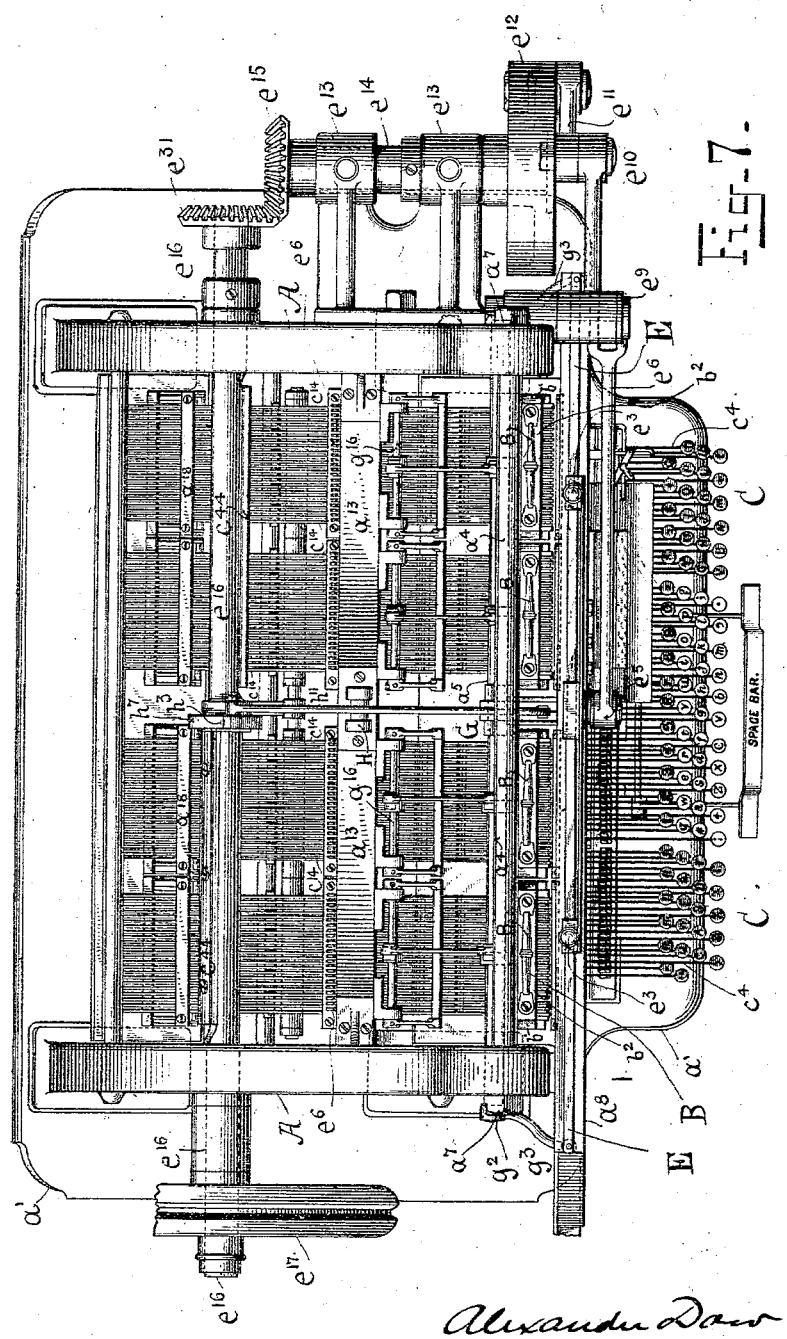
Witnesses
Chas. Hanimann
Emma H. Finlayson.
Alexander Dow
Inventor
By Stewart & Stewart
his Attorneys

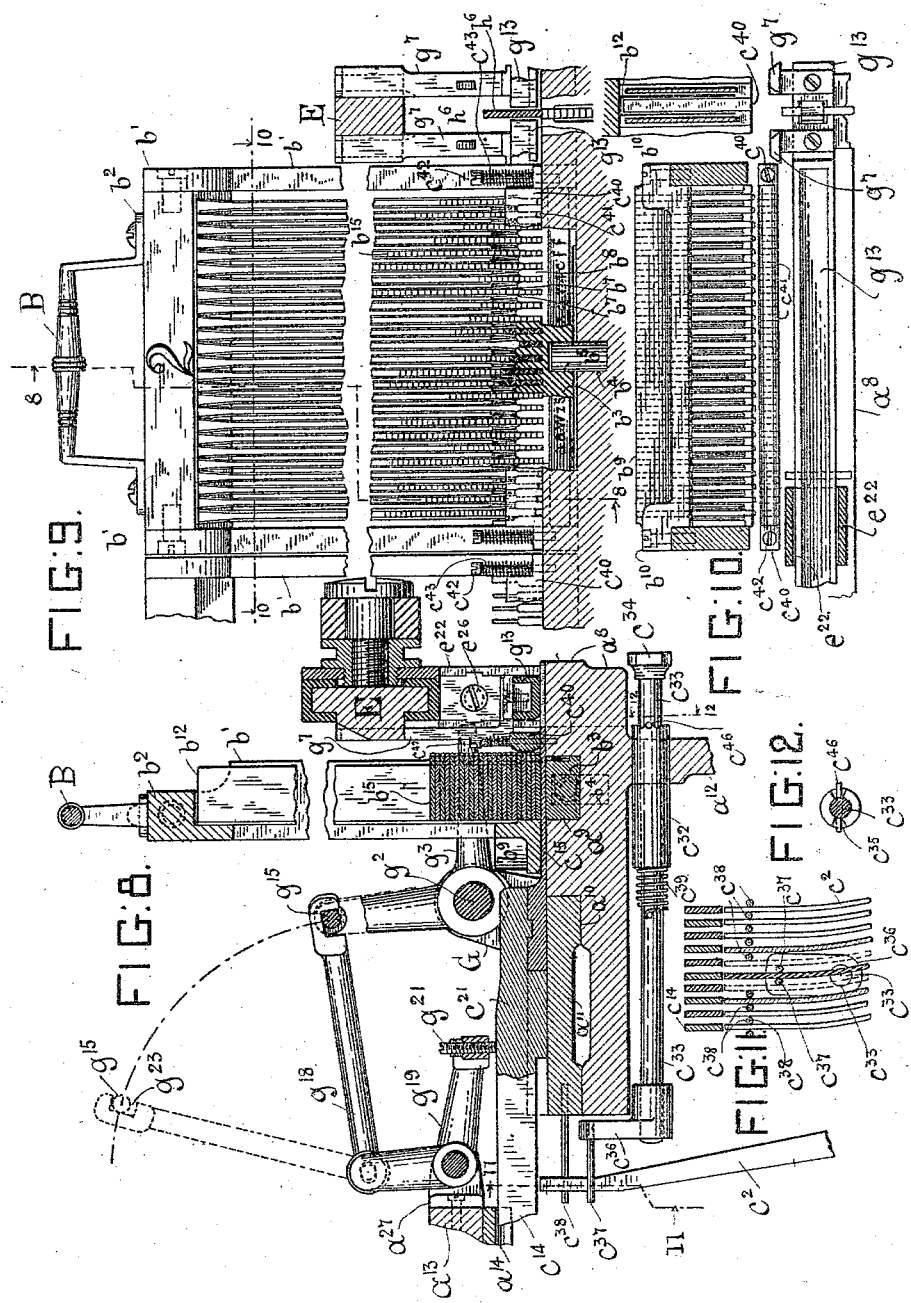

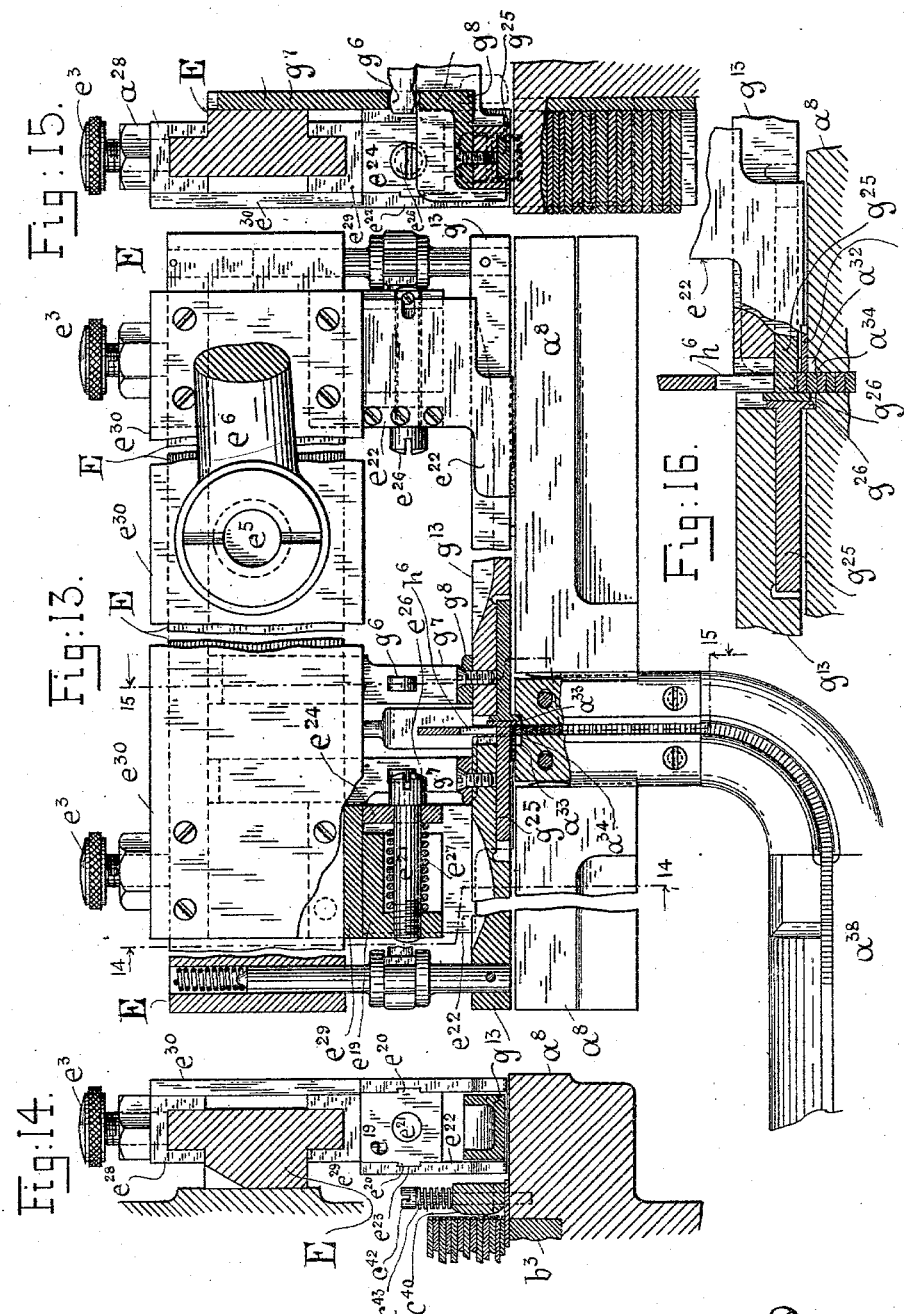

No. 637,858. Patented Nov. 28, 1899.
A. DOW.
TYPE SETTING MACHINE.
(Application filed July 31, 1896. Renewed Oct. 21, 1898.)
(No Model.) 14 Sheets—Sheet 7.
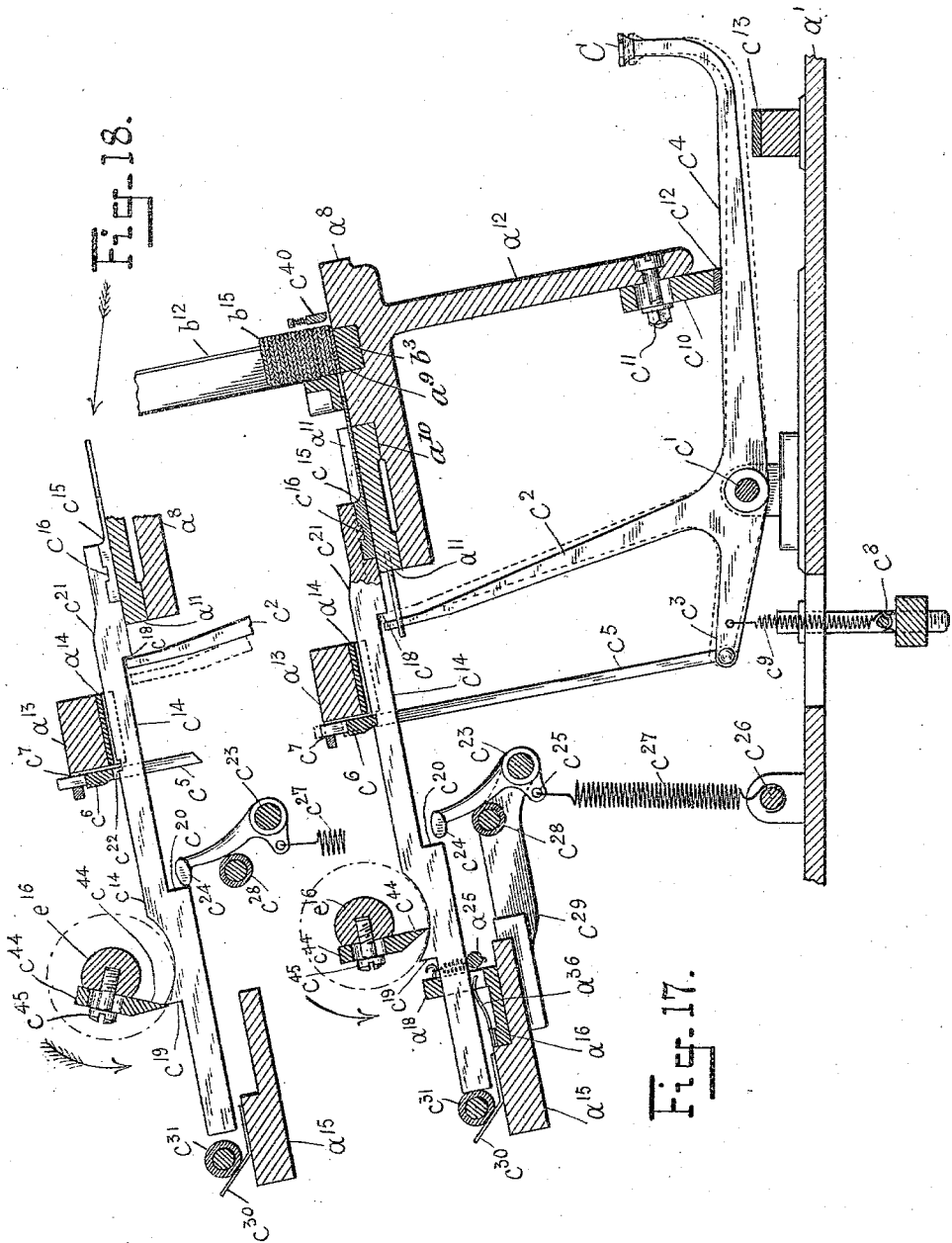
Witnesses
Chas. Hanimann
Emma W. Finlayson.
Alexander Dow
Inventor
By his Attorneys
Stewart & Stewart

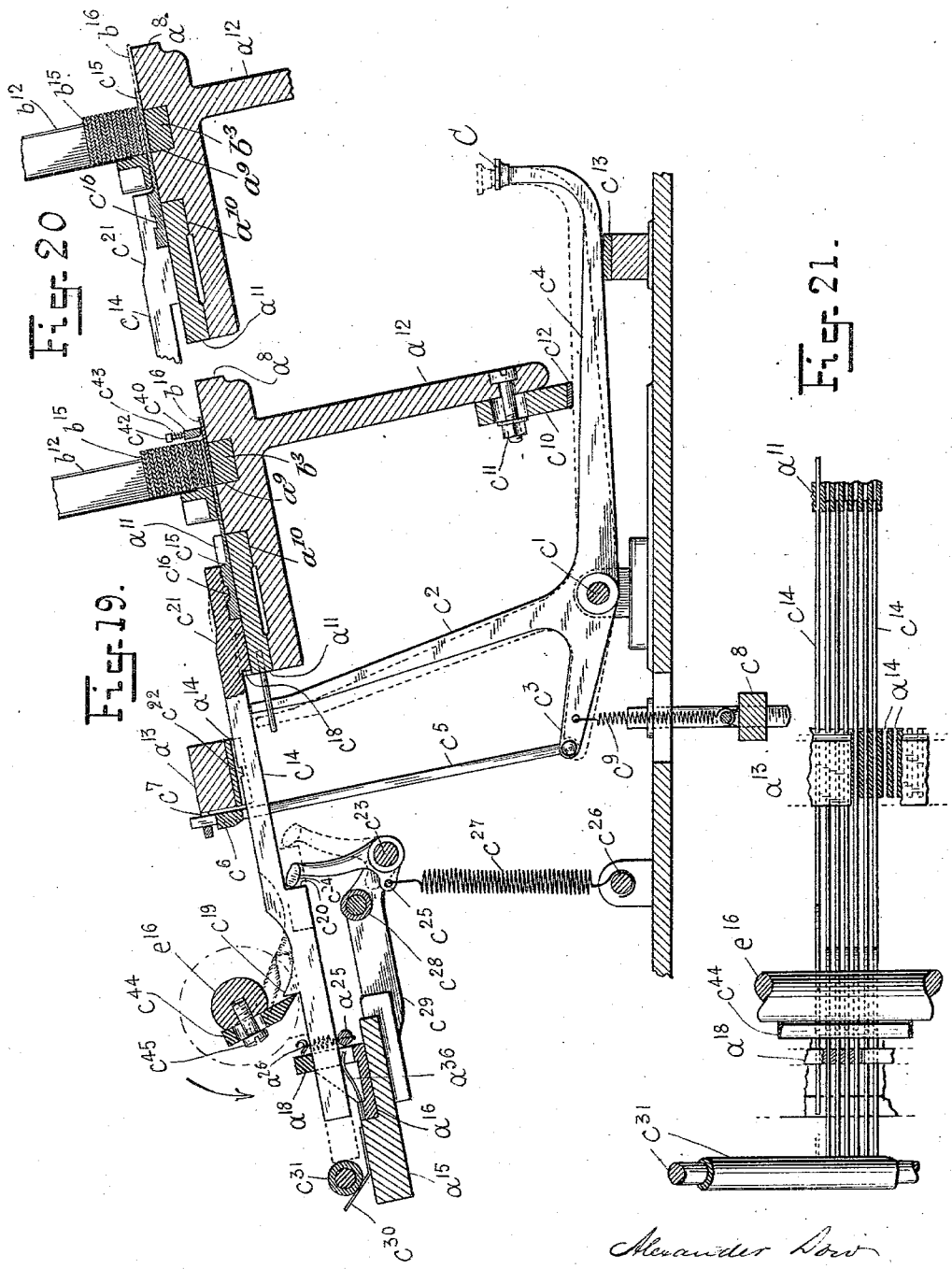

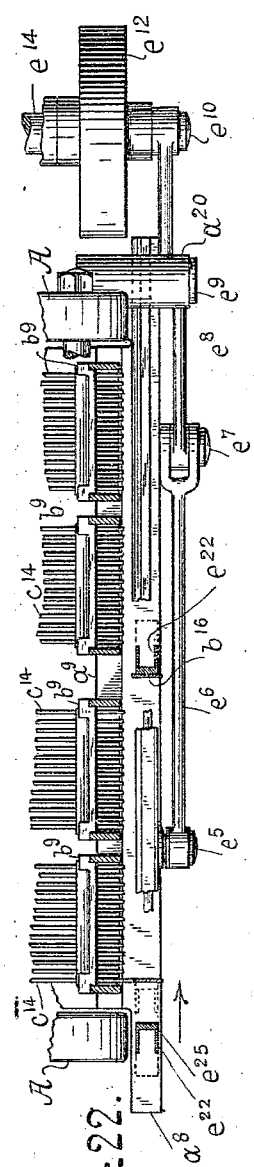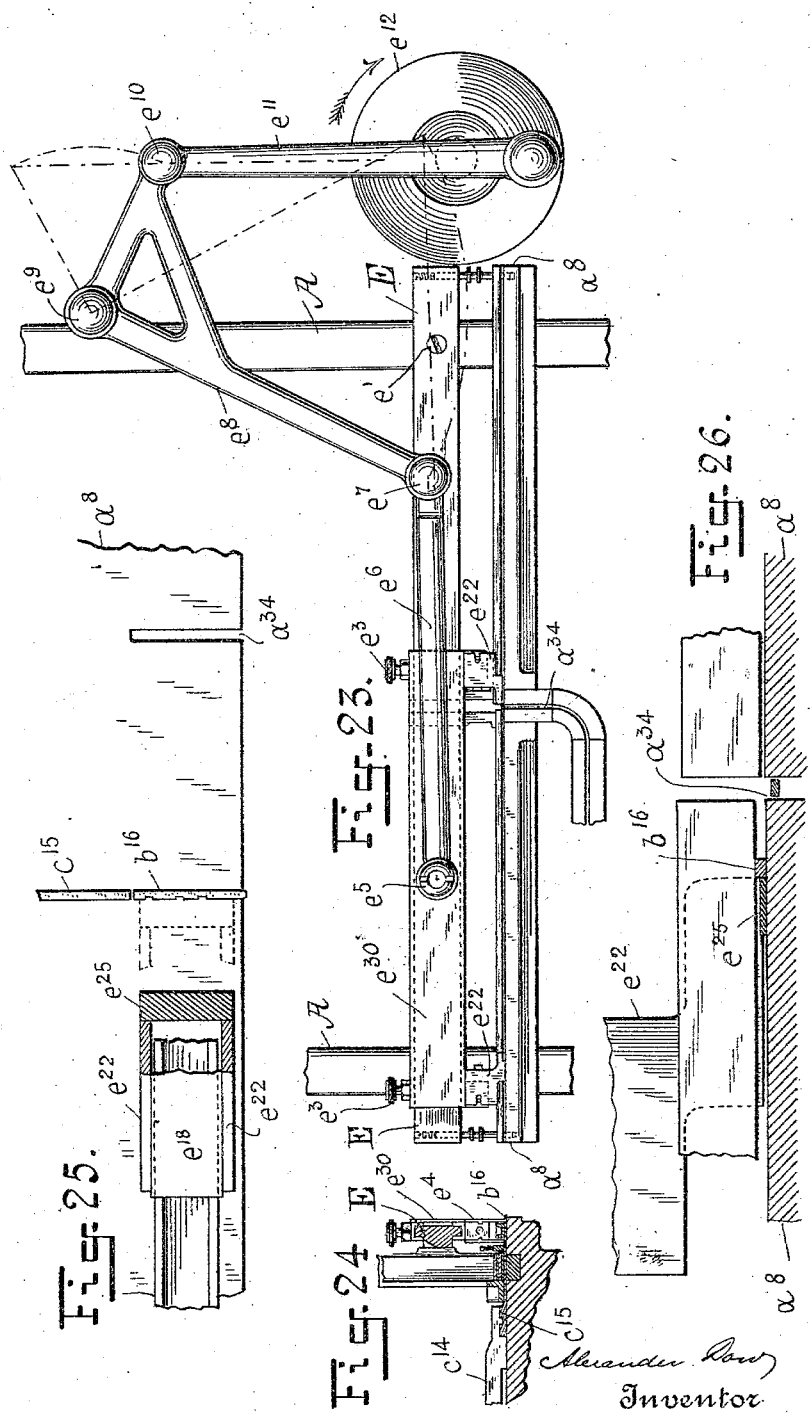

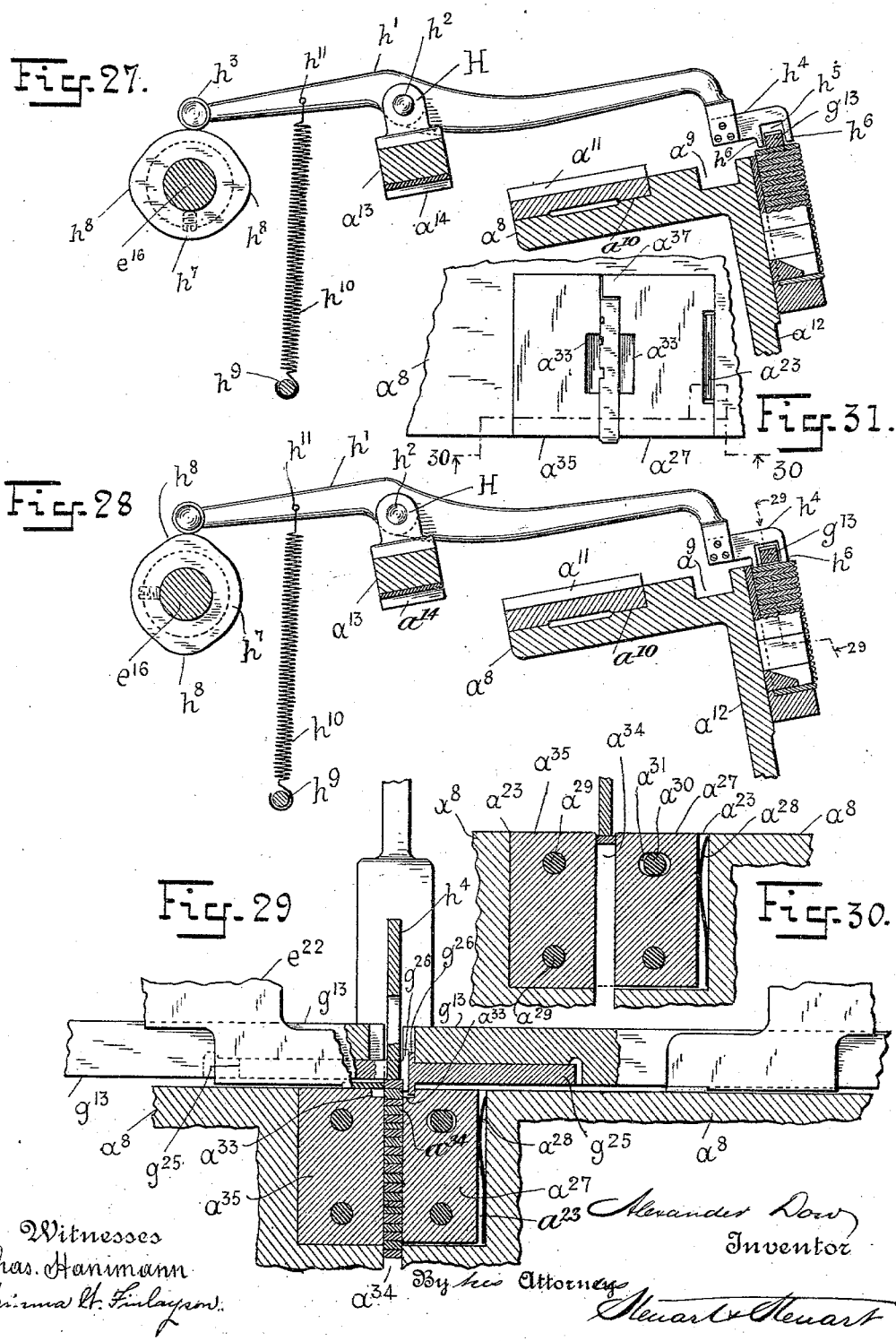

No. 637,858. Patented Nov. 28, 1899.
A. DOW.
TYPE SETTING MACHINE.
(Application filed July 31, 1896. Renewed Oct. 21, 1898.)
(No Model.) 14 Sheets—Sheet 11.
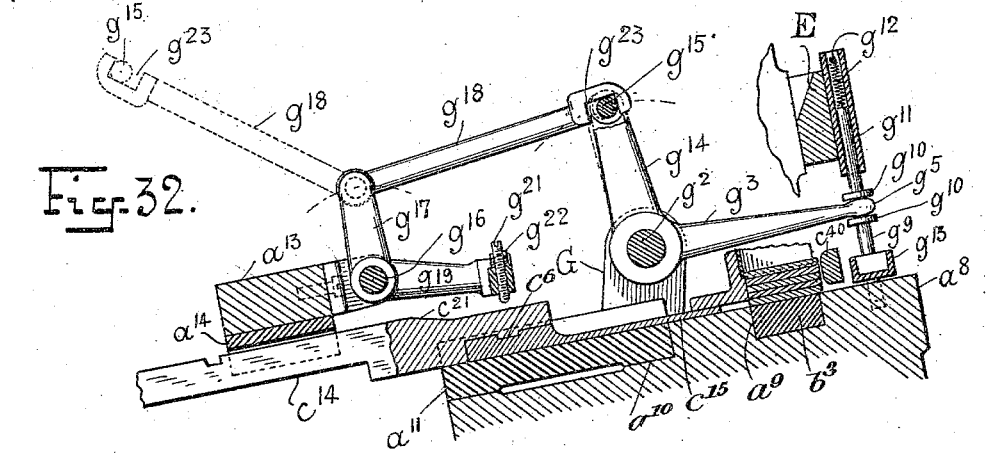
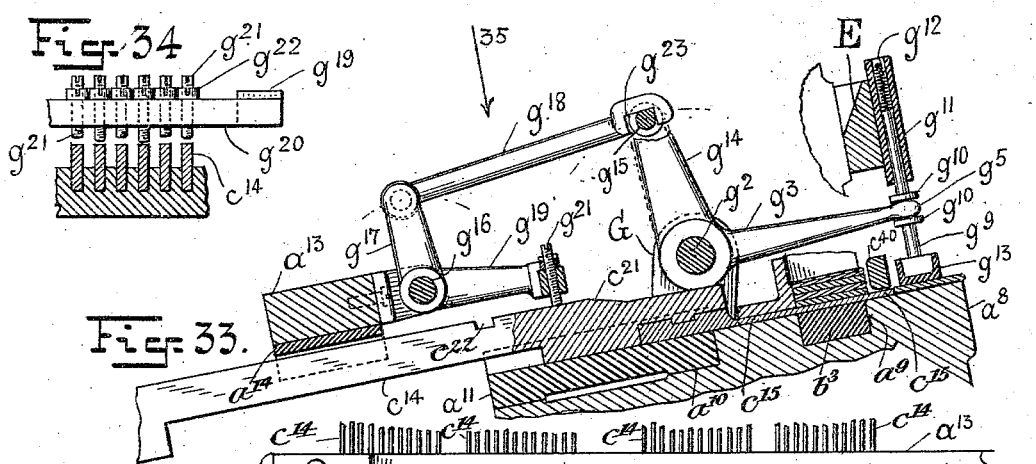
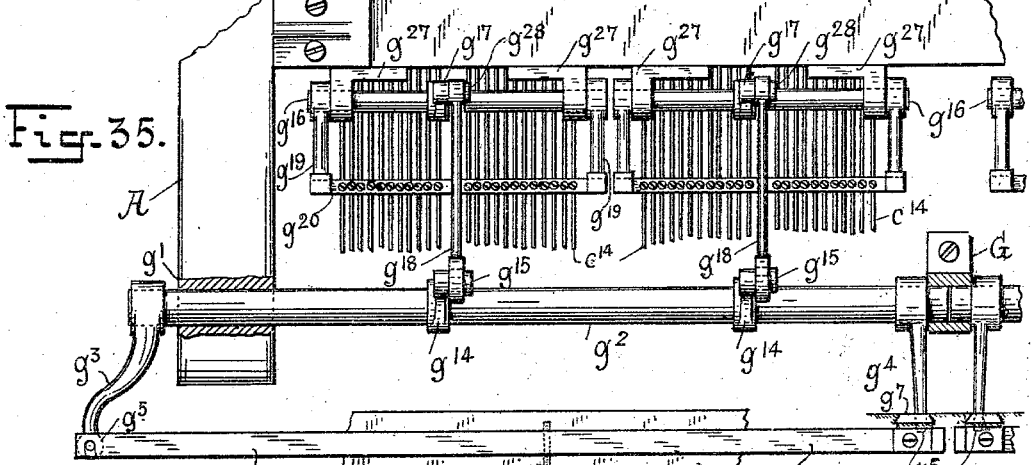
Witnesses
Chas. Hanimann
Emma H. Finlayson
Alexander Dow Inventor
By his Attorneys
Stewart & Stewart

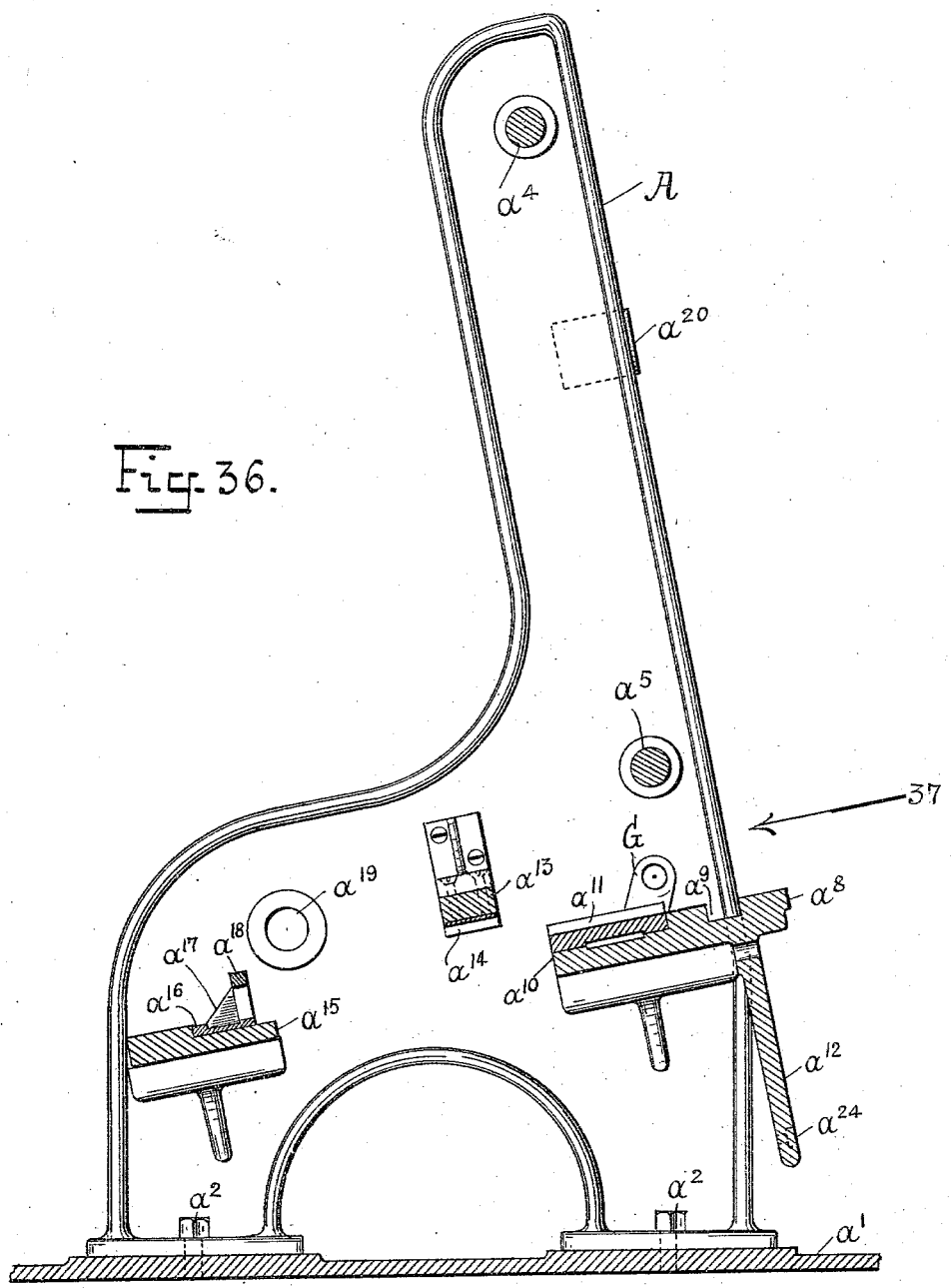

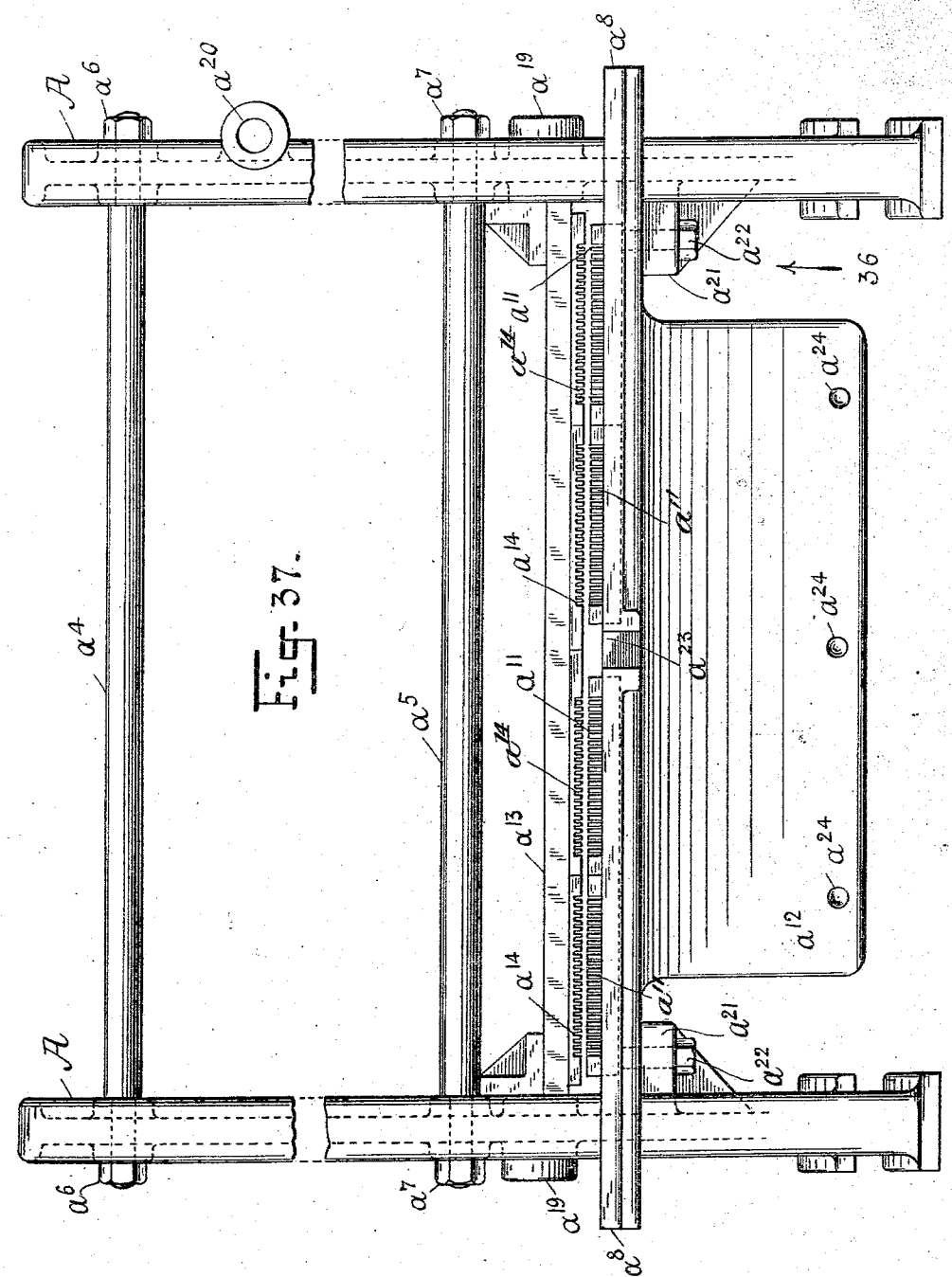

No. 637,858. Patented Nov. 28, 1899.
A. DOW.
TYPE SETTING MACHINE.
(Application filed July 31, 1896. Renewed Oct. 21, 1898.)
(No Model.) 14 Sheets—Sheet 14.
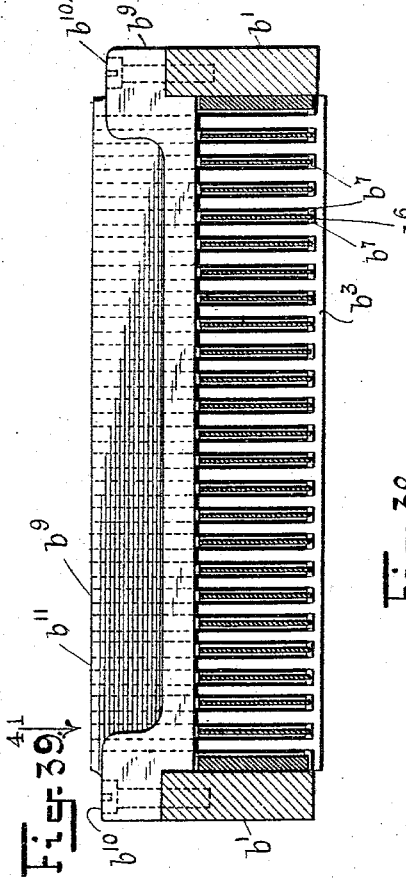
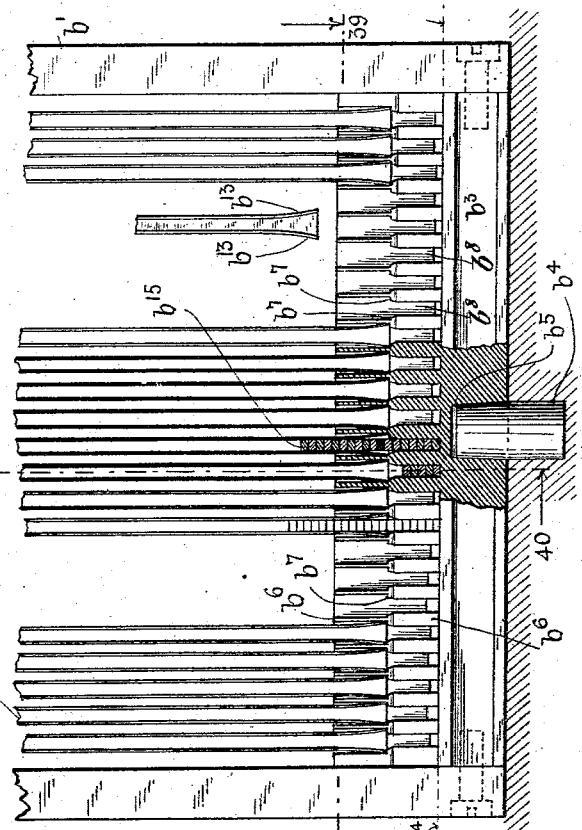
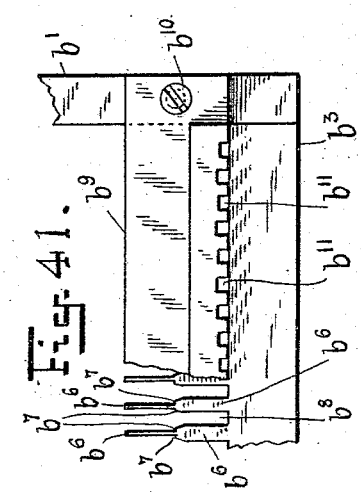
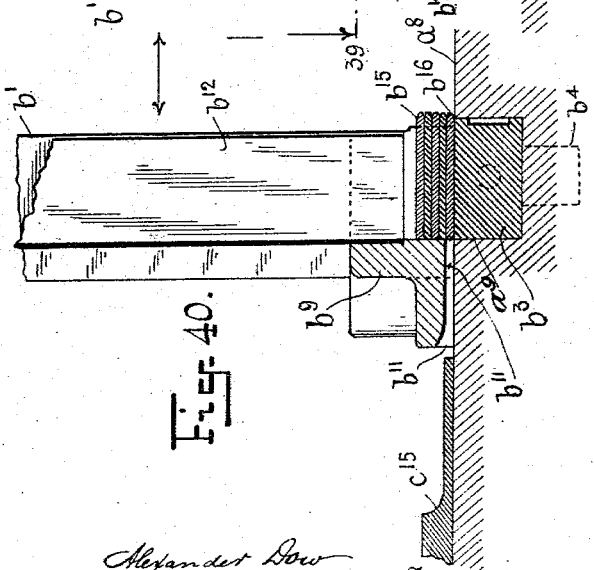
Witnesses
Chas. Hanimann
Emma H. Finlayson
Alexander Dow
Inventor
By his Attorney
Stewart & Stewart

UNITED STATES PATENT OFFICE.

ALEXANDER DOW, OF NEW YORK, N. Y., ASSIGNOR TO THE DOW COMPOSING MACHINE COMPANY, OF WEST VIRGINIA.

TYPE-SETTING MACHINE.

SPECIFICATION forming part of Letters Patent No. 637,858, dated November 28, 1899.

Application filed July 31, 1896. Renewed October 21, 1898. Serial No. 694,240. (No model.)

*To all whom it may concern:*

Be it known that I, ALEXANDER DOW, a citizen of the United States, and a resident of New York city, county and State of New York, have invented certain new and useful Improvements in Type-Setting Machines, of which the following is a specification.

My invention relates to an improvement in that class of machines known as "type-assembling devices" or "type-setting machines"—that is to say, that class of apparatus whereby printers' type are automatically taken from reservoirs or cases containing the same by the operation of the mechanism of the machine as controlled from a keyboard and are set in the form of words and sentences with appropriate spacing between them.

Broadly speaking, my invention relates generally to a novel machine for composing printers' type into words and lines mechanically. This operation is performed by the uniting of coöperative mechanism into an organized apparatus whereby from a keyboard an initial movement is given to the apparatus, which movement is completed by the operative mechanism of the machine automatically acting to set the type. This organized machine embraces several subordinate combinations which coöperate to make up the assembled machine, and yet which in themselves are complete operative mechanisms, which in their relation to the assembled device may be termed the "subordinate combinations of elements," and these subordinate combinations of elements may be regarded either in association with the assembled machine or individually as separate apparatus working together as a complete invention, which combinations may in themselves be used in connection with other appropriate devices with which they may coöperate. These subordinate combinations may be classified as follows: first, type reservoirs or cases, in combination with an assembling-table so arranged as to feed the type to the assembling-table as the same are required in the operation of the machine; second, devices for ejecting the type from the reservoirs or cases and delivering the same upon the assembling-table; third, a type-driving apparatus—that is to say, devices operating to collect the type as the same are delivered on the assembling-table and to deliver the same at a slot or type-channel; fourth, devices for subjecting the type to a uniform restraint during the period of their movement on the assembling-table under the operation of the assembling mechanism, and, fifth, devices for positively forcing or expelling the type from the assembling-table into the slot or type-channel.

My machine may be specifically classified as one wherein individual type are selected and delivered on an assembling-table and thence driven to a type channel or slot located approximately in the center of said assembling-table and forced into said channel, to the end that the type are assembled immediately in front of the operator of the machine and may be reviewed by him as they are assembled by the machine and are delivered to the slot or channel in the center of the assembling-table from each side alternately, to the end that the assembling mechanism has a minimum travel and is capable of very rapid movement. It is also a machine operating positively—that is to say, by positive mechanical movements as distinguished from natural forces, such as the forces of gravity or electromagnetism—the operation of the device being dependent upon the force of gravity alone in the matter of the feed of the type in the channels of the reservoir, and here equivalent mechanical forces may be employed. Furthermore, my apparatus causes the type to be delivered on the assembling-table lying upon their side, thus presenting to the operating mechanism bodies constantly varying in thickness, to which condition the said mechanism automatically adjusts itself.

I have illustrated my invention in the accompanying drawings and designated the parts by letters, referring to like parts by like letters.

Figure 1 is a front elevation of the device, showing the type reservoirs or cases set up in position, the type-driving mechanism, and the keyboard. Fig. 2 is a vertical section of Fig. 1, showing the operative parts, which will be hereinafter described in detail. Fig. 3 is an enlarged drawing of the operative parts of Fig. 2, the specific details of which will be hereinafter more particularly referred to. Fig. 4 is a vertical section of a detail of Fig. 3, showing the apparatus for forcing the type from the type-table; and Fig. 5 is another view of the same. Both of these details are, however, more specifically illustrated in Figs. 27 and 28. Fig. 6 is a detail of the ejector-bar and the ejector. Fig. 7 is a plan view of the device, showing mainly the keyboard and the arrangement of ejector-bars with the operative mechanism of the device. Fig. 8 is a vertical section of the machine, showing in detail a portion of the device for exercising a friction on the type during their passage over the assembling-table, and this drawing also shows a detail of what is known as the "ejector mechanism," whereby the levers are shifted so as to operate upon more than one ejector-bar at the will of the operator. Fig. 9 is a detail of a type-reservoir or type-case, showing a portion broken away to illustrate the construction thereof. Fig. 10 is a section of Fig. 9, taken on the line 10 10. Fig. 11 is a vertical section taken on the line 11 11 and n the direction of the arrow 11. Fig. 12 is a vertical section taken on the line 12 12. Fig. 13 is an elevation, partly in section, showing the mechanism by which the type are moved on the assembling-table, together with the central slot, to which the type are delivered. Fig. 14 is a section of Fig. 13, taken on the line 14 14. Fig. 15 is a vertical section of Fig. 13, taken on the line 15 15. Fig. 16 is a detail showing the friction-dogs that are intended to arrest the movement of the type as they approach the slot or channel intended to receive the same in the assembling-table. Figs. 17, 18, 19, and 20 are vertical sectional views which are intended to illustrate the operative parts of what I term the "type-ejector mechanism," showing the operative parts in their normal and also in their operative positions—that is, as follows: Fig. 17 shows the normal position and Fig. 18 the initial position—that is to say, the position when an initial movement is given to the same from the keyboard—and Fig. 19 is a further step in the movement of the apparatus, wherein the operative parts of the ejector mechanism—that is to say, those which are automatically operated—begin their operation upon the ejector-bar to eject the type, and also in dotted line is shown the completion of this operation; and in Fig. 20 the type is shown ejected. Fig. 21 is a plan view of the ejector-bars, showing their relation to each other and the manner in which they move in ways. Fig. 22 is a horizontal section of the type-reservoir and a plan view of the assembling mechanism operating on the assembling table. Fig. 23 is a front elevation in detail of the assembling apparatus. Fig. 24 is a vertical section of Fig. 23. Fig. 25 is a detail of Fig. 22, showing the relation of the type-driver with the type and slot in the table. Fig. 26 is a detail showing part of the construction of the type-driver in its relation with the friction-bar and of the device for forcing the type from the assembling-table into the slot or type-channel. Fig. 27 is the normal and Fig. 28 is the operative position of said device. Fig. 29 is a vertical section of the assembling-table and the type slot or channel within said table. Fig. 30 is a detail view of said type slot or channel. Fig. 31 is a plan view of said type slot or channel. Figs. 32, 33, 34, and 35 are intended to illustrate the devices for creating a uniform friction upon the type during its movement upon the assembling-table. Figs. 32 and 33 show in vertical section that part of the device in normal and in operative position, and Fig. 35 is a plan view showing the rocking frame of the friction devices, and Fig. 34 is a vertical section showing how the contact-points make contact with the beveled shoulder of the ejector-bar. Fig. 36 is a vertical section showing one side of the frame of the apparatus and the table upon which the operative parts are mounted. Fig. 37 is a front view of the frame in elevation in the direction of the arrow 37 in Fig. 36. Fig. 38 is a detail view of the reservoir or type-frame. Fig. 39 is a horizontal section of Fig. 38 on line 39 39. Fig. 40 is a vertical section of Fig. 38 on line 40 40. Fig. 41 is a rear plan view of Fig. 39 in the direction indicated by the arrow 41.

I will now describe the several parts of my apparatus, dividing the same, as best I may, into groups in order that the same may be more clearly understood. In the first place I will describe the frame of the machine with its operative connections and the assembling-table, which becomes part of the frame when considered in relation therewith.

*Frame of the machine and assembling-table with operative connections.*—$a'$ is the table, which forms a base-plate for the operative mechanism of the device. $a^2 a^2$, &c., are bolts intended to hold said table $a'$ to suitable supports—such as $a^3 a^3$, &c.—which are intended to rest upon the ground.

A and A are the two uprights of the machine, which are suitably braced together, preferably by the stays $a^4$ and $a^5$, which are suitably secured to said frame by the nuts $a^6$ and $a^7$.

$a^8$ is what I term an "assembling-table," for the reason that the type are ejected from the type-reservoirs upon said table and are forced across the face of said table to a slot in the center of said table, where they are assembled or brought together. This table $a^8$ is secured between the uprights A and A and becomes a brace between said parts of the frame.

$a^9$ is a slot or aperture in the table $a^8$, running parallel with the length thereof and intended to be of a size to receive the type cases or frames of the type-reservoirs, which will hereinafter be more fully described.

$a^{11} a^{11}$, &c., are blocks of metal milled out to form ways for the ejector-bars, hereinafter shown in Fig. 37 and are intended to rest in the apertures $a^{10}$, which are provided for the same in the table $a^8$.

$a^{12}$ is an apron preferably made as part of the table $a^8$.

$a^{13}$ is a brace secured between the two uprights of the frame A and A and operates also as a hanger, to which are secured metal blocks $a^{14}$ and $a^{14}$, &c., similar to those described under the title $a^{11}$—that is to say, milled to operate as guides for the ejector-bars, hereinafter to be described.

$a^{15}$ is a brace suitably secured between uprights A and A, intended to operate as a support for certain hangers and other devices, which in like manner operate as a support for and coöperate with the ejector-bars.

$a^{16}$ is the base of what I term a "hanger" for the ejector-bars. It is provided with the brackets $a^{17}$ $a^{17}$, between which is supported the bar $a^{18}$.

$a^{25}$ is a cushion-bar suitably supported by the helical springs $a^{26}$ and $a^{26}$ at either end thereof and by said springs secured to a cross-bar $a^{18}$. One of these cushion-bars $a^{25}$ is appropriately supported beneath each group of ejector-bars. It will be seen in Fig. 7 that there are four groups of these ejector-bars, and I therefore provide four of these cushion-bars and appropriate supporting-frames for each one of these groups.

$a^{19}$ is a journal-bearing within the upright of the frame A, Fig. 36. This journal-bearing is duplicated in the opposite frame of the machine, corresponding to the one shown in Fig. 36; but it is deemed unnecessary to illustrate the same.

$a^{20}$ is a socket to receive a spindle to carry the operative crank-lever of the assembling mechanism, hereinafter to be described.

$a^{21}$ and $a^{21}$ are brackets upon which the table $a^8$ is mounted and to which said table is secured by the bolts $a^{22}$ and $a^{22}$.

$a^{23}$ (shown in Fig. 37) is an aperture in the table $a^8$ to receive the elastic type-channel, which is shown in detail in Figs. 29, 30, and 31 and which will be hereinafter more fully described.

$a^{24}$, &c., are apertures in the apron $a^{12}$ by which the cushion-bar, hereinafter to be described, is secured.

The flexible slot within the table $a^8$ and aperture $a^{23}$ is described as follows: I provide two walls $a^{35}$ and $a^{27}$ for said slot, which slot is designated as $a^{34}$. These are pivoted together at $a^{37}$ and are adapted to fit into said aperture $a^{23}$, the knife-spring $a^{28}$ being interposed between one wall of the aperture $a^{23}$ and the back of the wall $a^{27}$ to cause the wall $a^{27}$ to move in the direction of the wall $a^{35}$. The wall $a^{35}$ is fixed within the aperture $a^{23}$ by the bolts $a^{29}$, and the wall $a^{27}$ moves upon the pivot $a^{37}$ and under the action of the spring $a^{28}$. I provide also the bolt $a^{30}$, which is secured within the aperture $a^{23}$ and adapted to move within the elliptical slot $a^{31}$, whereby the movement of the wall $a^{27}$ is limited.

$a^{33}$ and $a^{33}$ are spaces provided in the top of the walls $a^{27}$ and $a^{35}$ to receive the heads of the dogs $g^{25}$ and $g^{25}$, hereinafter to be referred to. These spaces are of sufficient size to permit the movement of said dogs within said spaces for purposes hereinafter to be described.

The slot between the walls $a^{35}$ and $a^{27}$ and within the table $a^8$ is designated as $a^{34}$. This slot is intended to receive the type, and during the passage of the type through the same a certain friction is brought to bear upon the same by the action of the spring $a^{28}$, and when said type, by means hereinafter to be referred to, is forced through said slot or channel $a^{34}$ it passes through an appropriate type channel or raceway to a point of delivery. I have indicated this raceway as $a^{38}$, and the same is shown in detail in Fig. 13.

I will now describe what I term the "type-reservoir or type-cases" in their detail of construction.

*Type-reservoir or type-cases.*—My purpose in the construction of this type-reservoir is to provide columns of type supported in cases, said type lying side to side, each case containing type representing a single letter standing at a slight inclination, as shown in Figs. 1 and 2, the lower surface of the bottom type in each case being in the plane of the surfaces of the assembling-table. To this end I construct a frame and provide the same with a handle B, &c. In the operation of my machine I employ four of these frames, as indicated in Fig. 1. This frame is constructed with two side bars $b'$ and $b'$ and a top bar $b^2$, with a base-bar $b^3$ forming the base of the frame. $b^4$ is a post secured within the table $a^8$ and preferably within the aperture $a^9$, and $b^5$ is a socket in said base $b^3$ to fit over said post $b^4$. The construction of the base $b^3$ is of particular interest and will now be described. The walls $b^6$ and $b^6$ are preferably made as part of the base $b^3$, and the spaces $b^8$ are milled out of said base $b^3$ to leave said walls $b^6$ and $b^6$, and each of said walls is provided with the shoulders $b^7$ and $b^7$. This detail is shown in Figs. 38 and 41. The milled space $b^8$ is of a width to receive the type in its uniform width and form a permanent type-channel in which the column of type rests. I also provide a rear support for the type-channels, which forms also a back for the base of the frame. I have designated this rear support or cross-bar as $b^9$. It is secured to the base-bar of the frame $b^3$ by the screws $b^{10}$ and $b^{10}$. I provide this bar $b^9$ with the milled channels $b^{11}$, &c. These channels are arranged in line with the milled spaces $b^8$ and are of an elevation corresponding with the width of the type, which are fed to the channel opposite which they are located.

$b^{12}$, &c., are type-channels, preferably made of thin metal to carry a column of type lying side to side, and I prefer to make the base of said type-channels $b^{12}$ with a bell flange, such as $b^{13}$ and $b^{13}$, adapted in their construction to rest on the shoulders $b^7$ and $b^7$, which thus form a support for the type-channels. It will be understood that these type-channels are readily removable from their position, as indicated in Fig. 38 and elsewhere. I have indicated a column of type within one of these channels as $b^{15}$. It will be noted that the lowest type in said channel, which I have indicated in Fig. 40 as $b^{16}$, is on a level or in the plane of the surface of the table $a^8$, as indicated at $b^{14}$ and $b^{14}$.

In the operation of the reservoir or type-case the frames having handles B B B B are each provided with preferably twenty-four type-channels, such as $b^{12}$. Each of these type-channels is loaded with type, as indicated at $b^{15}$, and containing characters of a similar kind—that is to say, all of the type bearing characters representing the letter "A" will be in one channel and that of "B" in another, and so on. In some instances, which will be hereinafter described, I load two or three channels, as the case may be, with similar type where the type is of that kind which is more frequently used than others in the operation of type-setting. I may load these type-channels by hand or through the operation of a machine known in the art as a "type-distributing" machine. When the channels are appropriately loaded, I place the frame within the machine, so that the base of the frame $b^3$ rests within the slot or aperture $a^9$ of the table $a^8$ and is supported by the cross-bars $a^4$ and $a^5$. The correct position of the reservoir within the slot $a^9$ is determined by the post $b^4$ and socket $b^5$—that is to say, the socket must be over the post before the frame can find its seat within the aperture $a^9$. When in position, as last described, it may be again noted that the type stand in column, one upon the other, the lower part of the column resting on the base of the channel $b^3$ and rising through said channel into the removable channels $b^{13}$, forming the column of type $b^{15}$. When the type-frame is placed in position within the table $a^8$, as heretofore described, the lowest type in each column is maintained by the base of the channel $b^3$ on a level with or in the plane of the surface of the table $a^8$, as indicated in Fig. 40, which figure, it will be noted, is a section of Fig. 38 on the line 40. I will presently describe how the lowest type in each column may be ejected from the reservoir upon the table; but it may be well to note here that the type rest one upon the other, forming a column, and that they descend to the surface of the table by gravity as the lowest type of each column is ejected.

I will now describe the operation of what I term my "selector and ejector apparatus"—that is to say, a selector device operating from a keyboard to perform an initial movement to select the particular type that I desire to be ejected, and then the ejector device by which the type is actually ejected upon the assembling-table.

*The type selector and ejector apparatus.*—The movements employed in this device are an initial movement controlled manually by the hand of the operator according to the arrangement of a keyboard and a mechanical movement operated in conjunction with the moving parts of the machine to eject the type. This movement is uniform and automatic. The several parts of this apparatus may be described as follows:

C is a keyboard constructed according to any of the well-known forms or arrangements of such keyboards best known in the art of type-writing machines. The selection of the type emanates from this keyboard under the hand of the operator. I have illustrated the operation of this selector and ejector apparatus as in vertical section in Fig. 3, where it is shown in association with the other devices with which it coöperates, and I have illustrated it as taken apart by itself in association only with the devices with which it directly coöperates in Figs. 17, 18, 19, 20, and 21, and I have limited my illustration to the operation of one key, for the reason that all the keys operate in a similar manner and the illustration of one is sufficient to illustrate all. C then may represent the entire keyboard as well as a single key. This key C forms one arm of a forked crank-lever, which is suitably mounted and pivoted at $c'$ and provided with the arms $c^2$, $c^3$, and $c^4$.

$c^5$ is a rod suitably hinged to the end of arm $c^3$ and carrying the tongue $c^6$.

$c^7$ is a guide to receive the rod $c^5$, secured to the hanger $a^{13}$.

$c^8$ is a binding-post suitably mounted, and $c^9$ is a helical spring interposed between the binding-post $c^8$ and the arm $c^3$, with its tension directed to normally maintain the key C in position to be operated upon.

$c^{10}$ is a cushion-plate suitably secured to the apron $a^{12}$ by the bolt $c^{11}$ and provided on its under side with elastic material $c^{12}$ to receive the shock of the key-lever $c^4$ as the same is retracted by the tension of the spring $c^9$. $c^{13}$ is also a cushion below said arm to receive the shock from the hand of the operator.

$c^{14}$ is one of the ejector-bars, and $c^{15}$ is an ejector.

$c^{16}$ is a square lug, being part of the ejector-bar $c^{14}$, and $c^{17}$ is a recess in the ejector $c^{15}$. This detail is shown in Fig. 6. When the square lug $c^{16}$ is seated within the recess $c^{17}$, the ejector $c^{15}$ becomes part of the ejector-bar $c^{14}$ and moves therewith. The ejector-bar $c^{14}$ is provided with certain shoulders, against which the operative parts, hereinafter to be described, operate to move said ejector-bar backward and forward. I have designated the shoulders as follows: $c^{18}$ is a shoulder which is engaged by the end of the arm $c^2$ to perform what I call the "initial" movement. $c^{19}$ is a shoulder which is engaged by a revolving blade operating automatically to drive the ejector-bar forward to the full limit of its throw, and $c^{20}$ is a shoulder engaged by a spring-trigger to retract the ejector-bar to its normal position. $c^{21}$ is a beveled shoulder to engage certain contact-points, which are part of a device employed by me to exercise upon the type a certain resistance during their movement on the assembling-table. This beveled shoulder will be more fully referred to hereinafter. The ejector-bar is also provided with a recess for the tongue $c^6$.

$c^{23}$ is a crank-lever suitably pivoted and provided at one end with a head or knob $c^{24}$ and connecting at the other end $c^{25}$ with a helical spring $c^{27}$, secured to a binding-post $c^{26}$.

$c^{28}$ is a cushion-bar suitably mounted on a bracket $c^{29}$, on which is also mounted said trigger $c^{23}$, the said bracket being secured to the table or brace $a^{15}$.

$c^{30}$ is an inclined plane secured to the table $a^{15}$, and $c^{31}$ is a cushion-bar preferably having a metal core, with an elastic covering adapted to rest between the abutting end of the ejector-bars and the inclined plane $c^{30}$.

Referring to Figs. 8, 11, and 12, I will now describe in detail the apparatus which has for its purpose the shifting of one of the levers $c^2$ above described, so as to bring the same into engagement with either one of three of the ejector-bars. The purpose of this device is to provide means by which by the operation of one key of the keyboard the lever $c^2$ connected therewith may be brought to operate upon one of three of the ejector-bars controlling the type in as many type-channels—that is to say, where three type-channels being side by side are loaded with type representing the same letter—as, for instance, the letter "A"—and in the course of the operation of the machine it is found that one column of said type is exhausted, the operator by the use of this shifting device, which I am now about to describe, may cause the lever $c^2$ to shift, so as to engage the ejector-bar on either side of its normal position, and thus cause said ejector-bar to operate upon one or the other of said columns of type, thus giving to the machine a capacity of three columns of type for each key, if such an arrangement should be desirable. The construction of this detail is as follows: $c^{32}$ is a sleeve suitably secured within an aperture of the apron $a^{13}$. This sleeve is provided with notches $c^{35}$ and $c^{35}$, substantially as indicated in Fig. 12. $c^{33}$ is a rock-shaft journaled within said sleeve $c^{32}$, and $c^{34}$ is a knob carried by said rock-shaft $c^{33}$. $c^{36}$ is a crank-arm secured to the end of said rock-shaft $c^{33}$, and $c^{37}$ and $c^{37}$ are guide-pins secured to said rock-shaft. These pins are indicated in Fig. 11, where it will be noted that the arm $c^2$ is held between said guide $c^{37}$ and $c^{37}$, and when the crank-arm is rocked by the rock-shaft $c^{33}$ in one direction the arm $c^2$ is brought against the guide $c^{38}$ and in line to operate another ejector-bar.

$c^{39}$ is a helical spring secured at one end to the rock-shaft $c^{33}$ and having its bearing against one end of the sleeve $c^{32}$.

$c^{46}$ is a cross-pin carried by the shaft $c^{33}$.

$c^{40}$ is a guard-bar suitably secured to the table $a^8$ by the guide-screws $c^{42}$. These guard-bars carry helical springs $c^{43}$, bearing upon said bar to maintain the same normally in contact with the surface of the table $a^8$. The bar $c^{40}$ is suitably milled or cut with channels $c^{41}$ of a depth to receive the type as the same are rejected from the type-reservoir and of sufficient size to permit said type to pass through said channels. The spring $c^{43}$ is interposed to permit the bar $c^{41}$ to rise should a type of abnormal thickness be forced out of the reservoir under abnormal conditions which will be hereinafter specified.

$e^{16}$ is a main shaft of the apparatus, hereinafter described, upon which is mounted the blade $c^{44}$, secured to said shaft by the screws $c^{45}$. With the revolution of said shaft said blade $c^{44}$ engages the shoulders $c^{19}$ to force the ejector-bar forward to the limit of its movements for purposes which will be hereinafter described.

It may be here noted that the cushion-bar $a^{25}$ is provided to permit a yielding of the ejector-bar as the same is engaged by the blade $c^{44}$ should there be any abnormal resistance to the operation of said ejector-bar.

I will now describe the operation of what I call the "selector and ejector mechanism" in connection with the cases or reservoirs of type, heretofore described. In addition to the description which is heretofore given of the apparatus it must be understood that the shaft $e^{16}$ (shown in section, Figs. 17, 18, and 19) is a main shaft journaled within the frame of the machine, carrying the beveled blade $c^{44}$, and that this shaft is kept in constant rotation during the operation of the machine. These features will be more fully described hereinafter; but for the present purpose the foregoing is deemed to be sufficient reference thereto. To a complete understanding of the operation of the mechanism it must also be made clear that each one of the keys of the keyboard is intended to control directly one ejector-bar carrying one ejector and that each ejector is intended to operate upon the lowest type in one column of type contained in one of the type-channels, such as $b^{12}$. It will therefore be understood that Figs. 17 to 21 represent the complete operation of the selector and ejector mechanism, and it will be also understood that all of the ejector mechanism by which the type are selected and ejected from each of the type-channels are duplicates of the one shown in said drawings and heretofore described. It will therefore be clear that a description of the operation of one of these selector and ejector mechanisms will be sufficient as a description of the whole.

Referring to Fig. 17, I have shown the apparatus in its normal position of rest, wherein one of the keys of the key-lever C is elevated in a position to be depressed by the hand of the operator. I have also shown the table $a^9$ with one of the type channels or reservoirs $b^{12}$ and a column of type $b^{15}$ within the same, resting at the base of the channel $b^8$ within the base of the frame $b^3$ and flush with the surface of the table $a^8$ in the line $b^{14}$ $b^{14}$. I have also shown all of the selector and ejector mechanism, the operation of which, in conjunction with said type-channel, I will now proceed to describe. It will be understood that the key illustrated in Fig. 17 is the one corresponding to the type in the type-channel shown. This being the case, when the operator desires to set a certain type represented by said key—as, for instance, the letter "A"—he will depress the key C until the type-bar $c^4$ rests on the cushion $c^{13}$. This operation will perform what I term the "initial" or "selecting" movement, which consists in, first, the elevation of the lug $c^6$ out of the recess $c^{22}$, thus releasing the ejector-bar $c^{14}$ from its locked position. This unlocking movement is performed in the partial movement of the key C, and in the completed movement of said key the arm $c^2$ is brought into engagement with the shoulder $c^{18}$ of the ejector-bar $c^{14}$ and said ejector-bar is moved forward—that is to say, toward the type—a distance indicated in Fig. 18—that is, sufficient distance to bring the shoulder $c^{19}$ into the operative field of the beveled blade $c^{44}$ in the course of its revolution, said revolution being indicated in dotted lines. The effect of this contact between the shoulders $c^{19}$ and the beveled blade $c^{44}$ is illustrated in Figs. 19 and 20, where it will be seen that the ejector-bar is driven forward with the revolution of said beveled blade $c^{44}$ to its full throw—that is to say, until in the revolution of said beveled blade $c^{44}$ the edge of said blade leaves the shoulder $c^{19}$, as shown in dotted lines, Fig. 19, and the complete throw is shown in Fig. 20, where it will be noted that the ejector $c^{15}$ has engaged the lowest type $b^{16}$ of the column of type $b^{15}$ and has ejected the same from the channel $b^{12}$ upon the surface of the table $a^8$. It may be noted here that the ejectors $c^{15}$, which are secured to the several ejector-bars $c^{14}$, are regulated in thickness according to the thickness of the type upon which they are intended to operate.

I have now described the operation whereby the type are selected by the initial movement of one of the keys of the keyboard and how they are ejected upon the table by the operation of the revolving beveled blade $c^{44}$. I will now describe how the ejector-bar $c^{14}$ is retracted to its normal position, cushioned, and locked. As the ejector-bar is moved forward by the beveled blade $c^{44}$ the shoulder $c^{20}$ is brought in engagement with the head $c^{24}$ of the trigger $c^{23}$ and said trigger is drawn back to the position shown in dotted lines in Fig. 19 against the tension of the spring $c^{27}$. When, therefore, the beveled blade $c^{44}$ in its revolution leaves the shoulder $c^{19}$, the ejector-bar $c^{14}$ is left under the operation of said trigger $c^{23}$ and spring $c^{27}$ and is thereby retracted. The trigger $c^{28}$ is, however, arrested in its movement by the cushion-bar $c^{28}$, as shown in Fig. 17, but the abutting end of the ejector-bar $c^{14}$ is driven against the cushion-bar $c^{31}$, which I have heretofore described as made with a loaded core and a cushioned covering. The operation is therefore to drive said cushion-bar $c^{31}$ to a limited degree up the inclined plane $c^{30}$, upon which it rests, and thus to cushion the retraction of the ejector-bar. The ejector-bar rebounds from this cushion, and the lug $c^6$ falls into its recess $c^{22}$, thus locking the ejector-bar in position for a further operation of the device. It may also be noted in this connection that the ejector $c^{15}$ first passes through the milled slots $b^{11}$, &c., in the cross-bar $b^9$. (Shown in a rear view in Fig. 41.) It then operates upon the type to eject the same, as shown in Fig. 19, and the type $b^{16}$, Fig. 19, passes beneath the bar $c^{40}$ of said figure—that is to say, through one of the milled slots of said bar, as $c^{41}$ of Figs. 9 and 10. This bar is interposed as a guide for the type in their passage to the table. As the ejector $c^{15}$ is retracted and withdrawn from beneath the column of type $b^{15}$ it falls under the action of gravity or under the pressure of an appropriate mechanical device, should such be deemed expedient, and rests on the base of the channel $b^8$ and on a level with the surface of the table $a^8$ and in position for the next operation of the ejecting mechanism.

From the foregoing it will be noted that the operator by manipulating the keys of the keyboard brings the apparatus into the operative position—that is to say, performs what I call the "selecting" of the type—and by the automatic operation of the devices, heretofore described, the type is ejected. This I call the "ejector apparatus."

I may also note that I interpose beneath the ejector-bars $c^{14}$ the cushion-bar $a^{25}$. This cushion is provided for the purpose of counteracting a condition which might occur—that is to say, an engagement between the edge of the shoulder $c^9$ and the edge of the blade $c^{44}$, in which case the cushion $a^{25}$ would yield under such pressure.

*Type-driving mechanism.*—I will now describe what I call the "type-driving mechanism"—that is to say, the mechanism by which I assemble or collect together the type as they are ejected upon the assembling-table and bring them to the central channel $a^{34}$. I have heretofore described this assembling-table, with its central slot or type-channel, and I have specified the mechanism by which I select and deliver the type from the type-reservoir upon the assembling-table. The present description assumes that one type is ejected upon the assembling-table $a^8$, as in Fig. 25, and it is the purpose of the devices which are about to be described to deliver said type at the slot $a^{34}$. The construction of these devices may be described as follows: E is a bar suitably secured between the braces A and A, preferably by screws, as $e'$, or otherwise. This bar E serves the purpose of a slide-bar and T-shaped in form, as indicated in vertical section in Figs. 14 and 24. Upon this T-shaped guide-bar are mounted the slide-bearings $e^{28}$ and $e^{29}$, secured together by the plate $e^{30}$.

$e^3$ and $e^3$ are adjustment-screws to take up any wear of the bearings.

$e^5$ is a stud secured to the plate $e^{30}$, by which the bearings $e^{20}$ and $e^{29}$ are secured together. Upon this stud $e^5$ is mounted the connecting-rod $e^6$, which is suitably secured at $e^7$ to the driving-lever $e^8$, the same being pivoted at $e^9$ upon the stud $a^{20}$.

$e^{11}$ is a connecting-rod connecting the other arm of the driving-lever $e^8$ to a stud on the side of the wheel $e^{12}$. The disk $e^{12}$ is mounted on one end of a shaft $e^{14}$, which is suitably sustained in the journal-bearings $e^{13}$ and $e^{13}$, which are supported by a suitable bracket connected with the frame A, and at the other end of the said shaft $e^{14}$ is suitably mounted a beveled gear $e^{15}$. The shaft $e^{16}$ and $e^{16}$ is suitably journaled in the bearings $e^{19}$ and $e^{19}$ in the walls of the frame A and A, and said shaft is provided at one end with a pulley $e^{17}$, by which power is conveyed to the machine, and at the other end with a beveled gear $e^{31}$, adapted to engage with the beveled gear $e^{15}$. It will be readily understood that the power thus conveyed through this train of gears and shafting is the power which operates the mechanical movement of the machine. Upon the shaft $e^{16}$ and $e^{16}$ are mounted the beveled blades $c^{44}$ and the cam-wheel $h^7$, hereinafter to be described. Through the operation of the crank-arms connected with the stud $e^5$ a reciprocating movement is given to the carrier formed of the face-plate $e^{30}$ and the bearings $e^{28}$ and $e^{29}$.

I will now describe the type-drivers, which are supported by being secured to the bearing $e^{29}$. These type-drivers are intended to drive the type from the position at which it is delivered on the assembling-table to the central slot or type-channel. The construction of these drivers is shown in elevation and also partly in section in Fig. 13 and in vertical section along the lines 14 14 of Fig. 14 and in vertical section along the lines 15 15 in Fig. 15. The description of the parts is as follows: $e^{19}$ is a bracket secured to the under side of the bearing $e^{29}$. The wall of said bracket which is at right angles to the under side of the bar $e^{29}$ is provided with the guides $e^{20}$ and $e^{20}$ (shown in Fig. 14) and with the screw-threaded hole $e^{21}$.

$e^{22}$ and $e^{22}$ are parallel walls provided with the ways $e^{23}$ and $e^{23}$ to receive the guides $e^{20}$ and $e^{20}$. These plates $e^{22}$ and $e^{22}$ are secured together by the brace-plate $e^{24}$, (shown in Fig. 13,) and they are also secured together by the driving-plate $e^{25}$, which is shown in Fig. 26. This plate $e^{25}$ is made of a thickness less than the thickness of the thinnest type which may be delivered upon the assembling-table, and, as heretofore stated, it is secured between the said walls $e^{22}$ and $e^{22}$, at the base thereof, and is intended to engage the type as the said walls are moved along the surface of the table. The connecting-plate $e^{24}$ is provided with an aperture to receive the bolt $e^{26}$, which is screw-threaded to pass freely through said aperture in the plate $e^{24}$ and screw into the screw-threaded aperture $e^{21}$. $e^{27}$ is a helical spring run upon said bolt $e^{26}$, with its tension directed to maintain the plate $e^{24}$ against the head of the bolt $e^{26}$. The operation of this assembling device is shown in Figs. 22 to 26. In Fig. 23 it will be noted that the parts supporting the type-drivers are given a reciprocating movement, and it is intended that this movement shall be of great rapidity, it being necessary to the successful working of the machine that each of the type-drivers should make one complete movement more rapidly than the operator can select a type by the keyboard. It will be evident, therefore, that this being the case it would be impossible or impracticable for the machine to deliver more than one type upon one side of the assembling-table during the interval of the reciprocating movement of the type-drivers. When a type is delivered on the assembling-table, as designated in Fig. 25 at $b^{16}$, the driving-plate $e^{25}$, which is carried by the walls $e^{22}$, and they in turn by the reciprocating carrier, engages the said type and forces the same into a position over the slot $a^{34}$. Should any obstruction arise in the way of the type, I provide the cushion-spring $e^{27}$ to relieve the shock that may be incident to driving the type against such obstruction. It will be readily understood that the plates $e^{22}$ and $e^{22}$ will slide on the guides $e^{20}$ and $e^{20}$, and the spring $e^{27}$ will yield to such pressure. This cushioning-spring is necessary in the event of two type of the same thickness being delivered upon the assembling-table at the same time, in which event the spring will compensate for the presence of the extra type at the point of delivery.

It will be noted that the screw $e^{26}$ screws into the bracket $e^{19}$, and it will be readily understood that this screw will control the relative throw of the type-drivers $e^{25}$ in their relation to the central channel $e^{34}$—that is to say, with the movement of these screws the drivers $e^{25}$ and $e^{25}$ may be adjusted nicely, so that in their reciprocal movement they will deliver the type exactly over the type-channel $a^{34}$.

It may be well to note here also that when I assemble the type-driving apparatus and the type-restraining device in the organized machine the walls $e^{22}$ and $e^{22}$, sustaining the type-driver $e^{25}$, span the friction-bars $g^{13}$, which move vertically between them.

I will now describe the operation of a mechanism by which I subject the type during their movement by the assembling device upon the assembling-table to a certain friction, which operates as a restraining force to maintain the type under the action of the driving mechanism of the assembling device. I call this the "type restraining and controlling mechanism."

*The type restraining and controlling mech-*

*anism.*—I have heretofore stated that when the type are delivered upon the assembling-table they rest upon one side, and as the sidewise dimensions of the bodies of the several letters of a font are seldom the same, ranging from the lower-case "i" and "t," which are the thinnest, to the upper-case "W," which is the thickest, it is necessary that a friction-bar, which may be used to exercise a slight pressure on the upper surface of said type for the purposes heretofore explained of controlling their movement, should automatically adjust itself to admit beneath whatever type is presented and rest lightly thereon. For this reason I have devised the apparatus which I am about to describe.

G is a bracket suitably mounted on the table $a^8$ and provided with journal-bearings.

$g'$ is a journal-bearing in the frame A.

$g^2$ is a rock-shaft suitably journaled in the bearing $g'$ and the bracket G.

$g^3$ is a crank-arm suitably mounted on the rock-shaft $g^2$ and provided at one end with bifurcated arms $g^5$.

$g^4$ is a crank-arm provided with the rounded head $g^6$.

$g^7$ is a beveled slide-plate moving in ways and having an aperture to receive the rounded head $g^6$ of the crank-arm $g^4$.

$g^8$ is a bracket, part of the slide-plate $g^7$, suitably secured to the friction-bar $g^{13}$, hereinafter to be more fully identified.

$g^9$ is a vertical rod provided with the flanges $g^{10}$ and $g^{10}$ to receive the bifurcated end $g^5$ of the crank-arm $g^3$.

$g^{11}$ is a sleeve suitably secured to the cross-bar E and adapted to receive the vertical bar $g^9$, with a helical spring interposed in said sleeve with its bearing upon the upper end of the rod $g^9$.

$g^{13}$ is a friction-bar suitably secured to the lower end of the vertical rod $g^9$ and to the bracket $g^8$, said bracket being shown in detail in Fig. 15.

$g^{14}$ and $g^{14}$ are crank-arms suitably secured to the rock-shaft $g^2$ and provided with spindles $g^{15}$ and $g^{15}$.

$g^{27}$ and $g^{27}$ are brackets provided with journal-bearings and secured to the cross-bar or hanger $a^{13}$.

$g^{16}$ and $g^{16}$ are rock-shafts journaled within the journal-bearings of said brackets $g^{27}$.

$g^{17}$ and $g^{17}$ are crank-arms carrying spindles $g^{28}$ $g^{28}$, and $g^{18}$ is a connecting-rod connecting the spindles $g^{15}$ and $g^{28}$.

$g^{19}$ and $g^{19}$ are crank-arms carrying between their ends the cross-bar $g^{20}$, and the cross-bar $g^{20}$ is arranged to carry the contact-points $g^{21}$, &c. A section showing these contact-points is illustrated in Fig. 34, in which it will be seen that contact-points are formed of screw-threaded points passing through said bar $g^{20}$ and provided with nut-locks $g^{24}$. In Fig. 32 it will be noted that the connecting-rod $g^{18}$ is provided at one end with an aperture $g^{23}$ to permit the free movement of said connecting-rod in one direction in relation to the spindle $g^{15}$.

In the operation of the friction-bar $g^{13}$ upon the type I find it necessary to interpose at the end of the friction-bar some means to arrest the movement of the type upon the assembling-table $a^8$ when said type under the action of the type-driver reaches the central slot. I therefore provide two dogs, one at each end of each friction-bar, with abutting heads. In Fig. 15 at $g^{25}$ I have shown a vertical section of one of these sliding dogs, which I have also designated in Fig. 16 as $g^{25}$. It will be noted in Fig. 15, $g^{25}$, that the dogs are beveled in form and adapted to slide in beveled ways, one in each friction-bar $g^{13}$. Each of these friction-dogs is provided with the heads $g^{26}$ and $g^{26}$ and arranged to abut one against the other and to move uniformly backward and forward, yet the arrangement permits each of them to be in a different plane, for the reason that their abutting cheeks engage each other without preventing a vertical movement.

I will now explain the operation of the type-restraining device which I have just described in detail. As heretofore stated, the purpose of this device is to exercise upon the type during their movement upon the assembling-table a certain friction, which it is desirable should be the same upon each type whatever its thickness. This friction is brought to bear on the type during their movement on the table to give to such movement a precision and certainty for the purpose of restraining such movement against the pressure of the type-drivers, so that the type may be always held in control while being acted on by the type-drivers.

As I have heretofore explained, the type are delivered upon the assembling-table lying upon one of their sides, thus presenting to be acted upon by the friction-bar bodies constantly differing in their thickness. It is necessary, therefore, to provide means by which said bar $g^{13}$ will be elevated above the plane of the assembling-table just enough to permit the type which is to be ejected upon said table to pass under said friction-bar $g^{13}$, and yet said bar $g^{13}$ must have a certain friction bearing upon said type in order to obtain the result which I accomplish by this mechanism. I therefore regulate the device so that the elevation of said pressure-bar $g^{13}$ may be varied as each type is ejected upon the table. I do this in the following manner: I provide the contact-points $g^{21}$, (shown in section in Fig. 34,) and I screw these contact-points into the cross-bar $g^{20}$ to form contact-points on the under side of said bar of different lengths. I have heretofore described how these contact-points engaged the beveled shoulders $c^{21}$ of the ejector-bar $c^{14}$ in the operation of forcing said ejector-bar to its complete throw, as heretofore described. It will therefore be understood that as any one of the ejector-bars is moved forward in the performance of its complete movement the contact-point which is arranged to engage the cam-shoulder $c^{21}$ of the particular ejector-bar which is operated will cause the crank-arm $g^{19}$ to be lifted as the contact-point engages said beveled shoulder, and with it will be moved the crank-arm $g^{17}$, connecting-rod $g^{18}$, crank-arm $g^{14}$, crank-arms $g^3$ and $g^4$, and hence the friction-bar $g^{13}$ will be lifted according to the degree of depression or elevation which is given to the contact-point $g^{21}$ in question.

The apparatus which I have just described may be termed a "rocking frame," by which the friction-bar is lifted with the movement of any one of the ejector-bars. It is my purpose in the operation of my device to deliver not more than one type on each side of the slot of the assembling-table with each completed movement of the type-drivers. Hence it follows that the friction-bar $g^{13}$ may be maintained at any predetermined degree of elevation or at any predetermined distance from the surface of the assembling-table during the passage of each type. For this reason I have provided two rocking frames, each carrying one friction-bar, adapted to exercise a certain friction upon the type during its movement beneath said bars, and as it is intended that only one type shall be presented beneath each of said bars during the said operation it is only necessary that said bar should be maintained at one elevation or distance from the surface of the assembling-table during the movement of said individual type upon said table. For the purpose of lightening the operation of the organized apparatus and reducing the friction upon contact-points $g^{21}$ and ejector-bars I have divided each of these rocking frames, so that only part of the working apparatus of the frame is moved with each engagement of the contact-point affecting the same. I accomplish this result by the slot $g^{23}$ in the connecting-rod $g^{18}$. It will be understood from an inspection of Fig. 35 in connection with Figs. 32 and 33 that when one of the contact-points engages the beveled shoulder of one of the ejector-bars one of the spindles $g^{15}$ will slide within the space $g^{23}$, while the other spindle will be engaged by the hooked end of the connecting-rod $g^{18}$ and drawn backward in the operation of the rocking frame.

I will now describe the means by which I force each type as it is brought over the type-channel in the assembling-table into said channel $a^{34}$ and thence into the raceway $a^{37}$.

*The type-forcer device.*—H is a bracket suitably secured to the brace $a^{13}$. $h^2$ is a shaft carried by said bracket, and $h'$ is a rock-shaft suitably mounted upon said shaft $h^2$.

$h^3$ is an idle contact-roller adapted to engage the cam $h^7$.

$h^4$ is a metal plate secured to the other end of the rock-shaft $h'$. This plate is provided with an aperture $h^5$, leaving two forcer-blades $h^6$ and $h^6$.

$h^7$ is a double-cam wheel mounted on the shaft $e^{16}$.

$h^8$ and $h^8$ are two eccentric elevations forming the double cam $h^7$.

$h^9$ is a binding-post.

$h^{11}$ is a hole in the rock-shaft $h'$, the helical spring $h^{10}$ being interposed between said binding-post and said rock-shaft, with its tension directed to maintain the roller $h^3$ in contact with the cam $h^7$.

The operation of the forcer is as follows: With the revolution of the cam $h^7$ the shaft $h'$ is rocked, and it is retracted by the spring $h^{10}$. By this operation the forcer-blades $h^6$ and $h^6$ are moved from their position shown in Fig. 27—that is to say, slightly above the level of the table $a^3$—to their position shown in Fig. 28—that is to say, slightly below the surface of the table $a^3$.

In the arrangement of the organized machine I so adjust the relative operation of the type-assembling mechanism and the type-forcer device as to cause the type-drivers $e^{25}$ in their movement operating from both sides of the central slot to deliver the type to the slot at the same moment or immediately before the operation of rocking the shaft $h'$, by which the type-forcer $h^6$ is caused to move from the position shown in Fig. 27 to that shown in Fig. 28. Hence it will be understood that the type are driven to said type-channel $a^{34}$ from both sides of the assembling-table traversed by the reciprocating type-drivers, and at the same instant that each type is brought over said type-channel $a^{34}$ the forcer mechanism acts upon the same to force the type into said channel.

I have heretofore described the construction of my machine in detail and the operation of each one of the subordinate combinations which go to make up the organized machine. I will now describe the operation of my organized machine—that is to say, the operation of the assembled combination in coöperation.

I have devised and heretofore patented a machine for distributing type after the same have been assembled, said patent being of the United States and dated November 24, 1896, numbered 572,050. By the operation of this device or others that may accomplish the same result the type are distributed and delivered into the channels which I have heretofore described, such as $b^{12}$. These channels are placed, preferably to the number of twenty-four, in each of the frames to which the handles B are attached. I place these frames, preferably four in number, in the machine substantially as shown in Fig. 1. The column of type in each channel immediately descends to the base of the slot $b^3$ and is therefore on a level with the surface of the assembling-table, and as the lowest type in each channel is ejected from said channel upon said table the other type in the channel fall under the action of gravity or any suitable mechanical device to take its place in position to be ejected.

I have found in the operation of assembling or setting type that there are certain type which are more frequently employed than others. These are usually found to be "a, e, h, n, o." I therefore find that it is desirable to load the channels or type-reservoirs with more of one type than another—that is to say, I will provide two channels of "a's," three of "e's," two of "h's," and so on, as I find the necessities of the case may require.

I have heretofore described the manner in which I cause certain of the arms $c^2$ of the key-lever to be so shifted as to engage one of two or one of three ejector-bars, as may be necessary. It will be understood that there is one ejector-bar and one ejector for each type-channel. Hence where I desire to employ three channels of "a's" I place said channels together in one frame in position to be operated upon by three ejector-bars which are under the control of a single key, as $c^2$, and said key is operated by one rocking shaft, as $c^{33}$, and one knob, as $c^{34}$. In Fig. 1 I have shown five of these knobs $c^{34}$ with the letters indicated thereon. As the type are placed in the channels of the reservoir $b^{12}$ the operator may read their characters as he is seated before the machine. He can therefore observe how the type in each channel are being consumed in the operation of the machine. If he perceives that one column, as of "a's," is being exhausted, he moves that one of the knobs $c^{34}$ controlling the "a" lever $c^2$ so as to bring it into position to act on the ejector-bar controlling the next column of type, and thus the operator by the movement of the knobs $c^{34}$ controls three columns of type in the channels $b^{12}$. It will therefore be manifest that the operator may by this device draw from three columns of type by one key without removing the type-channels or frame. When the whole or part of the type in the channels carried by one frame are exhausted, it is removed and replaced by another filled with loaded cases or reservoirs.

The machine is set in motion by the movement of the pulley-wheel $e^{17}$. Thus the power is conveyed along the shaft $e^{16}$, the shaft $e^{14}$, crank-levers, and connecting-rods communicating with the stud $e^5$, which is secured to the face-plate $e^{80}$ of the type-driver carrier. With the revolution of said pulley $e^{17}$ the type-drivers $e^{25}$ are caused to reciprocate over the face of the table $a^8$, each of said drivers $e^{25}$ sweeping the table from the extreme throw of the crank-arm $e^8$ in one direction to the edge of the slot $a^{34}$ in the other. Thus whatever type may be delivered upon the surface of the table $a^8$ and beneath the friction-bar $g^{13}$ will be driven or swept by said drivers $e^{25}$ between said friction-bar and the surface of the table to the said slot or type-channel. The shaft $e^{16}$ is provided with two beveled blades $c^{44}$, set in the position shown in Fig. 3. As heretofore stated, these beveled blades are adapted to engage each shoulder $c^{19}$ of each ejector-bar $c^{14}$ when said shoulder is brought into the field of said blade. In Fig. 7 it will be noted that one of these blades is adapted to affect that group of ejector-bars that deliver type to one side of the assembling-table, and that the other is adapted to engage that group of ejector-bars which are arranged to deliver type to the other side of said table, and that these blades are set on opposite sides of the shaft $e^{16}$, as shown in Fig. 3, one being shown in solid lines and the other in dotted lines. It will be understood that these blades $c^{44}$ only operate upon the ejector-bars when the shoulder $c^{19}$ is brought into the field of their operation. The normal movement of said blades is one of constant rotation and out of contact with the ejector-bars $c^{14}$, a semicircular-shaped space being formed in said bars to admit the rotation of said blades without engagement therewith. The machine is thus set in motion, and I prefer that its operation shall be sufficiently rapid to reciprocate the type-drivers to deliver type to the type-channel $a^{34}$ as fast as the operator moving the keyboard can operate the same to deliver one type at a time upon the assembling-table—that is to say, one type upon either side of the central channel of the assembling-table. In other words, it is my purpose in the normal operation of my machine to eject but one type upon either side of the type-channel during the period occupied by one complete movement of the type-drivers. The machine being thus in rapid motion the operator may proceed to select the type that he desires to be assembled by operating the appropriate keys of the keyboard C—that is to say, suppose as a letter to be selected the operator chooses the letter "a," to select the type corresponding with said letter he will depress the appropriate key operating upon the ejector-bar, which in its turn operates upon the column of type in the reservoir which contains the "a" type. This operation has already been described; but it may be well to review the same briefly in order that all of the movements may be understood in connection with the other parts of the apparatus. The depression of the "a" key heretofore referred to will first operate to unlock the ejector-bar $c^{14}$ and to move the said ejector-bar forward a short distance, as indicated in Fig. 18—that is to say, sufficient to bring the shoulder $c^{19}$ into the field of one of the beveled blades $c^{44}$. It being understood that these are revolving with great rapidity, it will necessarily follow that as the edge of said blade makes contact with the shoulder $c^{19}$ the ejector-bar $c^{14}$ thus operated upon will be driven forward with considerable velocity, moving in the ways $a^{10}$ and $a^{14}$, and the ejector $c^{15}$ will be driven against the lowest type in the column of type contained in the channel $b^{12}$, and said type will be ejected from said reservoir or channel $b^{12}$, passing through the aperture provided to receive the same in the guard-bar $c^{40}$, and thence it will be delivered upon the surface of the table $a^3$. This movement of the ejector-bar $c^{14}$ also performs the other function of lifting the friction-bar $g^{13}$ to an appropriate elevation above the surface of the table $a^8$ to receive the type delivered upon the table, as last stated. This operation is performed by the contact-point $g^{21}$ engaging the beveled shoulder $c^{21}$ of the ejector-bar $c^{14}$. As the same is operated by this contact, the rocking frame by which the friction-bar $g^{13}$ is controlled is rocked with a sufficient movement to elevate said friction-bar $g^{18}$ above the table against the pressure of the spring $g^{12}$ a distance sufficient to permit the type ejected from the channel $g^{12}$, as heretofore recited, to pass under the said friction-bar $g^{13}$ with a slight pressure—that is to say, the friction-bar $g^{13}$ is so adjusted as to bear upon the type under the action of the spring $g^{12}$ and hold the same between its under surface and the upper surface of the table with a friction sufficient to operate as a restraining resistance to the movement of the said type while being operated on by the type-driver $c^{25}$. The ejector is then retracted under the action of the trigger $c^{49}$ and is cushioned against the cushion-bar $c^{31}$ and falls into its normal position and is finally locked by the lug $c^6$ falling into the recess $c^{22}$, and the friction-bar $g^{18}$ rests on the type depressed by the spring $g^{12}$.

It will be observed that the operation thus described contemplates several movements. First, the operator depresses a key of the keyboard representing the letter which he selects. This I term the "manual" selection of the type, as distinguished from the mechanical operation by which the type are ejected. By this operation the shoulder $c^{19}$ is brought into the field of the revolving blade $c^{44}$. Second, the ejector-bar is moved forward by said blade, and the type is delivered upon the table, and by this same movement of the ejector-bar the rocking frame causes the friction-bar $g^{13}$ to be lifted to receive the type and restrain the movement thereof upon the table, and, third, the ejector-bar is retracted and falls into its normal position, and as it is retracted the column of type descends, so as to bring the lowest type into the position of that one which has just been ejected and in position itself to be operated upon by the ejector $c^{15}$. It being understood, therefore, that one type is ejected from the reservoir and delivered upon one side of the assembling-table $a^4$ and is lying under the uniform pressure of the bar $g^{13}$ the next movement is that of forcing the type by the operation of the driver $e^{25}$ over the face of the table and delivering the same over the type-channel $a^{34}$. This movement is accomplished with great rapidity, and the type are driven or swept by said driver $e^{25}$ toward the channel $a^{34}$ and at the same time held by the friction-bar between the under surface of said bar and the surface of the table. It will be understood that by the operation of the keys of the keyboard the type are delivered upon one side or the other of the type-channel in the assembling-table, and that the two type-forcers are constantly operating to force the type toward the said type-channel, and the two friction-bars $g^{13}$ are constantly exercising a restraining force upon said type in their movement upon the table; but it will be readily understood that the resistance exercised by the friction-bar upon the type might not be sufficient to arrest the movement of the type directly in front of the type-channel $a^{34}$. For this reason I have provided the friction-dogs $g^{25}$ and $g^{25}$ with the heads $g^{26}$ and $g^{26}$. When the type is driven over the table beneath the restraining resistance of the friction-bar $g^{13}$ and it comes to the end of the stroke of the type-driver $e^{25}$ and in contact with the head $g^{26}$ of the dog $g^{25}$, the dog is moved in its beveled ways to the extent of its movement, carrying with it the opposing dog, and it will be noted that the limit of its movement will positively arrest the movement of the type immediately above the type-channel $a^{34}$. The next movement is therefore that of forcing the type from the position last described into the type-channel. This is accomplished as follows: I have heretofore described the operation of the type-forcer, but it may be well to note again how the same operates in conjunction with the operative parts of the machine as assembled. The normal position of the forcer-blades $h^6$ and $h^6$ is that shown in Fig. 27, and it will there be seen that these forcer-blades span the friction-bar $g^{13}$ and stand immediately above the type just as it is delivered, restrained by the friction-dogs $g^{25}$, as heretofore described. At this moment one of the eccentric faces of the cam $h^7$ operates to rock the shaft $h'$, and by this operation the forcer-blades $g^6$ are brought in contact with the type delivered above the type-channel, and the said type is forced into said channel $g^{34}$, driving ahead of it whatever type may be already in the channel, and thus the type are continually forced into the channel and through the raceway $a^{88}$.

It is the purpose of my apparatus to deliver the type upon the assembling-table when the type-drivers are at the farthest limit of their movement away from the central channel. I accomplish this result by so adjusting the relative position of the forcer-blade $c^{44}$ with reference to the type-drivers as to bring the said forcer-blades into position to make contact with the shoulder $c^{19}$ of the ejector-bar when the said type-drivers are at the limit of their movement. This operation may be described in detail as follows: The rotation of the disk $e^{12}$ imparts to the type-drivers a rapid reciprocating movement, causing said forcers alternately to approach to and withdraw from the centrally-located slot in the assembling-table, as has been described, the only office of the type-drivers being to assemble the type as selected by the operator and delivered on the table into a composed line in the central channel $a^{34}$. Should the ejector deliver a type upon the assembling-table in front of either of said drivers as they move from the centrally-located channel aforesaid, where it is intended said type shall be assembled, the effect would be to force any type so delivered from the said slot instead of toward it. It is essential, then, to the successful working of my machine that the contact of the blade $c^{44}$ with the shoulder $c^{19}$ on the ejector-bars by which a type is delivered on the assembling-table should be impossible while the type-drivers $e^{25}$ are moving from the slot $a^{34}$ to the limit of their outward movement. I find it necessary, therefore, to so adjust the time of contact on the blade $c^{44}$ with the shoulder $c^{19}$ of the ejector-bar that said contact can occur only while the type-drivers are changing the direction of their movement on the assembling-table from an outward direction to one toward the center of the assembling-table. The adjustment by which this is effected is made in the following manner: The main driving-shaft $e^{16}$ carries at one extremity the beveled gear-wheel $e^{31}$, which is intended to engage with the similar beveled gear $e^{15}$, carried by the short shaft $e^{14}$. It is necessary that these two beveled gears should be of the same diameter in order that the two shafts aforesaid shall rotate in equal times. Now it will be seen that said shafts just referred to, one carrying the beveled plates $c^{44}$, that actuate the ejector mechanism, and the other actuating the assembling type-drivers $e^{25}$, may be so set with respect to each other that the blades $c^{44}$, for instance, can only engage the shoulder $c^{19}$ of the selected ejector-bar while the type-driver operating on the same side of the machine is changing from a movement outward to one toward the centrally-located slot in the assembling-table. When these relative positions of the blade and the type-forcer have been made, as described, the two beveled gears $a^{31}$ and $e^{15}$ (the machine being at rest) are made to engage and are then secured to their respective shafts in the usual way.

It is obvious from the foregoing description that the two blades $c^{44}$ are set with respect to each other at an angle of one hundred and eighty degrees, so that they act alternately first on the ejector-bars of one side and then upon those of the other, the relation between the blades $c^{44}$ on one side and the type-driver $e^{25}$ on the same side being that the blade $c^{44}$ is adapted to engage the shoulder $e^{19}$ at the same time that the type-driver on the same side of the machine is reversing its movement and starting toward the type-channel $a^{34}$. It will be obvious that the same adjustment is employed on the opposite side of the machine as regards the relative position. Now when motion is imparted to the machine it will be found impossible to deliver a type upon the assembling-table while either of the type-drivers is moving from the central slot, and consequently every type delivered upon said table is forced to said centrally-located slot, as described, and into the assembled line.

There is one feature of the operation of my machine to which I desire to call attention, as it may not be at first apparent from the foregoing description, which is to the effect that under certain conditions in the operation of the machine there may be found one type on the assembling-table beneath the friction-bar on one side of the central channel and at the same time a type on the other side of the central channel and beneath the friction-bar. The possibility of this condition existing will make apparent the necessity of the employment of two friction-bars, one on either side of the central channel, for the reason that if the type beneath the friction-bar on one side are of greater thickness than the type beneath the friction-bar on the other side and these two friction-bars were united together as one bar then the operation of the friction-bar would be such that only the thickest type would be affected by the operation thereof. Hence I have employed two friction-bars, one controlling the operation of the type on one side of the central channel and the other controlling the operation of the type on the other side of the central channel. The conditions under which this operation may be seen is as follows: Suppose I depress two keys, one to effect the ejection of the type on one side of the central channel and one to effect the ejection of the type on the other side of the central channel. The machine is then set in motion. The type first ejected will in the course of the operation of the drivers be swept toward the central channel, and the adjustment of the machine is such that just before the arrival of said type at the central channel the ejector mechanism operating on the other side of the central channel will operate to eject the type selected as aforesaid. Hence the condition will be manifest—that is to say, there will be two type on the two sides of the assembling-table at the same time. One of these type may be of one thickness and one of another, and hence it is necessary in order that the friction-bars may be effectively operative upon the type, no matter what their relative thickness may be, the friction-bars must operate independently of each other. It is evident, therefore, that when the machine is in continuous and regular operation the question as to whether or not two type are in reality upon the table at the same time depends entirely upon the time interval between the depression of two keys by the operator, and when manipulated at nearly its full capacity—i. e., when a letter is set at each half-revolution of the driving mechanism (when they so happen to occur in words)—it is apparent that two letters are present on opposite sides of the assembling-table very frequently, and hence entirely independent friction-bars and their controlling mechanisms must be provided on each side of the central channel; otherwise letters of variable width could not be controlled.

The machine is so adjusted that the type are ejected upon the table when the type-driver operating on that side of the central channel on which the type is ejected is at the extremity of its movement away from the central channel. In my claims hereinafter I have referred to the ejector mechanism as taking place when the type-drivers are at the extremity of their movement. I do not intend by this language to confine myself absolutely to the remote point of the extremity of their movement away from the central channel. I simply intend to convey that the ejector mechanism is operated at a time when the drivers are withdrawn from the path of the type, as the same are or may be ejected in order that there may be no collision between the type as the same are ejected and the drivers and in order that the type may be ejected before and not behind the drivers—that is to say, between the drivers and the central channel.

What I claim, and desire to secure by Letters Patent, is as follows:

1. The combination in a type-assembling machine of a type-assembling table, provided with a centrally-located type-channel, two type-drivers operating alternately from either side of the type-channel to drive the type delivered on the table to said channel, means operating automatically in unison with the drivers to eject the type on either side of the table when the respective drivers are at or near the extremity of their movement away from the central channel, a friction-bar suitably supported with reference to said table, and means controlled by the type-ejecting mechanism to lift said friction-bar off the table a variable distance according to the thickness of the type ejected, and means to cause said bar to bear on the type as the same is ejected and during its movement on the table with a pressure, intended to operate as a restraining resistance, as the type are ejected on the table or moved over the face thereof, substantially as described.

2. The combination in a type-assembling machine of a type-assembling table provided with a centrally-located type-channel, two type-drivers operating alternately from either side of the channel to drive the type delivered on the table to said central channel, and means operating automatically in unison with the drivers to eject the type on either side of the table when the drivers are at or near the extremity of their movement away from the central channel, two friction-bars suitably supported with reference to said table one on either side of the central channel, and means controlled by the type-ejecting mechanism to lift said friction-bars off the table a variable distance, according to the thickness of the type ejected, and means to cause said bars to bear on the type, as the same are ejected, and during their movement on the table, with a pressure intended to operate as a restraining resistance, as the type are ejected on the table or moved over the face thereof, substantially as described.

3. The combination in a type-assembling machine of a type-assembling table, provided with a centrally-located type-channel, two type-drivers operating alternately from either side of the type-channel to drive the type delivered on the table to said central channel, and means operating from a keyboard to move ejector-bars into position to be operated upon by automatically-operated ejector-blades, said blades being arranged to engage the ejector-bars, when the drivers are at or near the most distant point in the extremity of their movement from the central channel, two friction-bars suitably supported with reference to said table, and operating independently, one on either side of the central channel, and means controlled by the type-ejecting mechanism to lift said friction-bars off the table a variable distance, according to the thickness of the type ejected and means to cause said bars to bear on the type as the same are ejected, and during their movement on the table with a pressure, intended to operate as a restraining resistance, as the type are ejected on the table or moved over the face thereof, substantially as described.

4. The combination in a type-assembling machine of a type-assembling table, provided with a centrally-located type-channel, two type-drivers operating alternately from either side of the type-channel, to drive the type delivered on the table to said central channel, and means operating from a keyboard to move ejector-bars into position to be operated upon by automatically-operated ejector-blades, said blades being arranged to engage the ejector-bars, when the drivers are at or near the most distant point in the extremity of their movement from the central channel, a friction-bar suitably supported with reference to said table, and means controlled by the movement of the ejector-bars in ejecting the type upon the table to lift said friction-bar off the table a variable distance, according to the thickness of the type ejected, and means to cause said bars to bear on the type as the same are ejected, and during their movement on the table with a pressure intended to operate as a restraining resistance, as the type are ejected on the table or moved over the face thereof, substantially as described.

5. The combination in a type-assembling machine of a type-assembling table, provided with a centrally-located type-channel, two type-drivers suitably mounted on a reciprocating carrier at either end thereof, with means to reciprocate said carrier, and means operating from a keyboard to move the ejector-bars into a position to be operated upon by automatically-operated ejector-blades, said blades being arranged to engage the ejector-bars, when the drivers are at the most distant point in the extremity of their movement from the central channel, two rocking frames suitably supported on either side of the central channel and carrying on one side of each a friction-bar, adapted to bear on the two sides of the table and on the other side of said frames, carrying contact-points to engage the beveled shoulders of the ejector-bars with a pressure interposed to normally maintain the friction-bars in contact with the table, the contact-points being adjusted with relation to the shoulders of each ejector-bar to lift the friction-bar with the operation of each ejector-bar sufficiently to permit the type controlled by said ejector-bar to pass between the friction-bar and the table with a friction to operate as a restraining resistance, as the type are ejected on the table or moved over the face thereof, substantially as described.

6. The combination in a type-assembling machine of a type assembling table, provided with a centrally-located type-channel, two type-drivers suitably mounted on a reciprocating carrier at either end thereof, with means to reciprocate said carrier, and means operating from a keyboard to move the ejector-bars into position to be operated upon by automatically-operated ejector-blades, said blades being arranged to engage the ejector bars, when the drivers are at the most distant point of their movement from the central channel, two rocking frames suitably supported on either side of the central channel, and carrying on one side of each a friction-bar, adapted to bear on the two sides of the table, and on the other side of said frames carrying contact-points to engage the beveled shoulders of the ejector-bars with a pressure interposed to normally maintain the friction-bars in contact with the table, the contact-points being adjusted with relation to the shoulders of each ejector-bar to lift the friction-bars with the operation of each ejector-bar, sufficiently to permit the type controlled by said ejector-bar to pass between the friction-bar and the table with a friction to operate as a restraining resistance, as the type is ejected or moved on the table with means to arrest the movement of the type at the central channel, and to force the same into said channel, substantially as described.

7. The combination in a type-assembling machine of a type-assembling table, with a central type-channel, and type-drivers operating alternately to drive the type to the central channel, first from one side of the table and then from the other side, appropriate type-reservoirs, type-ejector bars suitably mounted to eject the type by a reciprocating movement, two ejector-blades suitably mounted to rotate together and to engage the ejector-bars when the same are brought into the path of their rotation, one of said blades being arranged to engage those ejector-bars operating to eject the type on one side of the table, when the driver operating on that side of the table is withdrawn to the extremity of its movement from the type-channel, and the other of said blades being arranged to engage those ejector-bars operating to eject the type on the opposite side of the table, when the driver operating on that side of the table is withdrawn from the central channel to the extremity of its movement, means controlled from a keyboard to give to said ejector-bars an initial movement to bring them into the path of the ejector-blades, two friction-bars suitably supported with reference to the table, one on either side of the central channel, and means controlled by the operation of said ejector-bars in ejecting the type upon the table to lift said friction-bars off the table a variable distance, according to the thickness of the type ejected, and means to cause said friction-bars to bear on the type as the same is ejected, and during their movement on the table with a pressure intending to operate as a restraining resistance, as the type are ejected on the table or moved over the face thereof, substantially as described.

8. The combination in a type-assembling machine of a type-assembling table, with a central type-channel, and type-drivers operating alternately to drive the type to the central channel, first from one side of the table and then from the other side, appropriate type-reservoirs, type-ejector bars suitably mounted to eject the type by a reciprocal movement, two ejector-blades suitably mounted to operate together and to engage the ejector-bars when the same are brought into the path of their rotation, one of said blades being arranged to engage those ejector-bars operating to eject the type on one side of the table, when the driver operating on that side of the table is withdrawn to the extremity of its movement from the type-channel, and the other of said blades being arranged to engage those ejector-bars operating to eject the type on the opposite side of the table, when the driver operating on that side of the table is withdrawn from the central channel to the extremity of its movement, means controlled from a keyboard to give to said ejector-bars an initial movement to bring them into the path of the ejector-blades, two friction-bars suitably supported with reference to the table, one on either side of the central channel, and means controlled by the operation of said ejector-bars in ejecting the type upon the table, to lift said friction-bars off the table a variable distance, according to the thickness of the type ejected, and means to cause said friction-bars to bear on the type as the same is ejected, and during its movement on the table with a pressure intended to operate as a restraining resistance, as the type are ejected on the table or moved over the face thereof, and means to arrest the movement of the type at the central channel and to force the same into the said central channel, substantially as described.

9. The combination in a type-assembling machine of an assembling-table with a central type-channel, and appropriate type-reservoirs, ejector-bars suitably mounted to eject the type from the reservoirs, said bars being provided with suitable shoulders, key-levers operating from a keyboard to give to the ejector-bars an initial movement by engaging one of the shoulders of said bars, two ejector-blades mounted on a normally-rotating shaft on opposite sides of the plane of its axis, one of these blades operating on one side of the central channel, and the other blade adjusted to engage the shoulder of the ejector-bars, operating on the other side of the central channel, when said shoulders are brought into the path of the movement of said blades by said initial movement operating from said keyboard, and means to retract said bars, two type-drivers suitably mounted to reciprocate together, one to drive the type from one side of the central channel when the other is retracted, and the other to drive the type from the other side of the table to the other channel, when the other is retracted, the ejector-blades being arranged to engage the ejector-bars to eject the type when the driver operating on that side of the table is at or near the extremity of its movement from the central channel, two rocking frames suitably supported on either side of the central channel, and carrying on one side of each rocking frame a friction-bar, and on the other side of each rocking frame a set of contact-points to engage beveled shoulders of the ejector-bar, with a spring interposed to normally maintain the friction-bars in contact with the table, said contact-points being adjusted in relation to the shoulders of each ejector-bar to lift the friction-bar with the operation of each ejector-bar, sufficiently to permit the type controlled by said ejector-bar to pass between the friction-bar and the table with a friction to operate as a restraining resistance upon the type as the same is ejected or moved on the table, substantially as described.

10. The combination in a type-assembling machine of a type-assembling table provided with a centrally-located type-channel, two type-drivers suitably mounted on a reciprocating carrier at either end thereof, with means to reciprocate said carrier, and means operating from a keyboard to move ejector-bars into position to be operated upon by automatically-operated ejector-blades, said blades being arranged to engage the ejector-bars when the drivers are at the most distant point in the extremity of their movement from the central channel, two friction-bars suitably supported one on either side of the table, and carrying at their adjacent ends reciprocating and abutting dogs, and means operated by the movement of the ejector mechanism to lift said bars to receive the type as the same are ejected upon the table, and means to depress said bars on the type as the same are ejected and moved on the table, to exercise on the type a restraining resistance, and means to force the type into the central channel, substantially as described.

11. The combination in a type-assembling machine of a type-assembling table with a centrally-located type-channel, two type-drivers as thin as the thinnest type, each supported between two walls suitably secured to a reciprocating carrier, one driver at either end of the carrier, with a spring-cushion interposed between each driver and the carrier, and means to reciprocate said carrier, and means operating from a keyboard to move ejector-bars into position to be operated upon by automatically-operated ejector-blades said blades being arranged to engage said ejector-bars, when the drivers are respectively at the most distant point in the extremity of their movement from the central channel, two friction-bars suitably supported, one on either side of the table, and carrying at their adjacent ends reciprocating and abutting dogs to arrest the movement of the type at the central channel, and means operated by the movement of the ejector mechanism to lift said bars to receive the type as the same are ejected upon the table, and means to depress said bars on the type as the same are ejected and moved on the table in order to exercise on the type a restraining resistance, and means to force the type into the central channel, substantially as described.

12. The combination in a type-assembling machine of a type-assembling table with a centrally-located type-channel, two type-drivers as thin as the thinnest type, each supported between two walls suitably secured to a reciprocating carrier, one driver at either end of the carrier, and means to reciprocate said carrier, substantially as described.

13. The combination in a type-assembling machine of a type-assembling table with a centrally-located type-channel, two type-drivers as thin as the thinnest type, each supported between two walls suitably secured to a reciprocating carrier, one driver at either end of the carrier, with a spring-cushion interposed between each driver and the carrier and means to reciprocate said carrier, substantially as described.

14. The combination in a type-assembling machine of a type-assembling table with a central type-channel, a carrier mounted to reciprocate in ways and means to reciprocate the same, a bracket secured to either end of said carrier, with two bifurcated frames mounted in ways to move horizontally one on each of said brackets, with two type-drivers as thin as the thinnest type, supported one between each of said bifurcated frames, with a spring interposed between each bracket and the frame carried thereby to cushion the driving force of the drivers, substantially as described.

15. The combination in a type-assembling machine of a type-assembling table with a central type-channel, a carrier mounted to reciprocate in ways and means to reciprocate the same, a bracket secured to either end of said carrier with two bifurcated frames mounted in ways to move horizontally, one on either of said brackets, with two type-drivers as thin as the thinnest type supported one between each of said bifurcated frames, with a spring interposed between each bracket and the frames carried thereby to cushion the driving force of the drivers, said frames secured to said brackets by an adjustment-screw to adjust the throw of the drivers with reference to the central channel, substantially as described.

16. The combination in a type-assembling machine of a type-supporting frame, provided in its base with type-channels to receive and support a column of type, a type-assembling table provided with an aperture to receive the base of said frame, with the base of said channels in the plane of the surface of said table, removable type-channels suitably supported within said frame, to feed the columns of type to the channels in the base of the frame, with suitable apertures in the base of each channel to permit ejectors to eject the lowest type in each column, substantially as described.

17. The combination in a type-assembling machine of an assembling-table with a central type-channel, and type-drivers operating alternately to drive the type to the central channel, first from one side of the table and then from the other side, appropriate type-reservoirs, type-ejectors suitably mounted to eject the type by a reciprocating movement, two ejector-blades suitably mounted to rotate together and to engage the ejector-bars, when the same are brought into the path of their rotation, one of said blades being arranged to engage those ejector-bars operating to eject the type on one side of the table, when the driver operating on that side of the table is withdrawn to the extremity of its movement from the type-channel, and the other of said blades being arranged to engage those ejector-bars operating to eject the type on the opposite side of the table; when the driver operating on that side of the table is withdrawn from the central channel to the extremity of its movement, means controlled from a keyboard to give to said ejector-bars an initial movement to bring them into the path of the ejector-blades, and means to retract said bars when the type are ejected, means to cushion said bars against the retracting movement, and means to cushion the same against the abnormal action of said ejector-blades upon the ejector-bars, substantially as described.

18. The combination in a type-assembling machine of an assembling-table with a central type-channel, and type-drivers operating alternately to drive the type to the central channel, first from one side of the table and then from the other side, appropriate type-reservoirs, type-ejectors suitably mounted to eject the type by a reciprocating movement, two ejector-blades suitably mounted to rotate together and to engage the ejector-bars when the same are brought into the path of their rotation, one of said blades being arranged to engage those ejector-bars operating to eject the type on one side of the table, when the driver operating on that side of the table is withdrawn to the extremity of its movement from the type-channel, and the other of said blades being arranged to engage those ejector-bars, operating to eject the type on the opposite side of the table, when the driver operating on that side of the table is withdrawn from the central channel to the extremity of its movement, means controlled from a keyboard to give to said ejector-bars an initial movement to bring them into the path of the ejector-blades, and means to retract said bars when the type are ejected, a loaded cushion-bar interposed between the abutting ends of the ejector-bars and an inclined plane, the rear end of said ejector-bars being supported by appropriate springs, substantially as described.

19. The combination in a type-assembling machine with appropriate type-reservoirs, of ejector-bars suitably mounted to reciprocate in ways to eject the type from the reservoirs, said bars being provided with suitable shoulders, key-levers operating from a keyboard, a revolving ejector-blade normally rotating, the key-levers adapted to give to the ejector-bars an initial projecting movement, sufficient to bring into the path of said revolving ejector-blade an appropriate shoulder of said ejector-bar by which engagement the ejector-bar is projected to eject the type, a spring-trigger adapted to engage a shoulder of said ejector-bar as the same is projected, and to retract the ejector-bar when the same is released from engagement with the ejector-revolving blade, substantially as described.

20. The combination in a type-assembling machine with appropriate type-reservoirs, of ejector-bars suitably mounted to reciprocate in ways to eject the type from the reservoirs, said bars being provided with suitable shoulders, key-levers operating from a keyboard, a revolving ejector-blade normally rotating, the key-levers adapted to give to the ejector-bars an initial projecting movement, sufficient to bring into the path of said revolving ejector-blade an appropriate shoulder of said ejector-bar, by which engagement the ejector-bar is projected to eject the type, a spring-trigger adapted to engage a shoulder of said ejector-bar as the same is projected, and to retract the ejector-bar when the same is released from engagement with the ejector-revolving blade, means to unlock the ejector-bars with the initial movement of the key-levers, and to lock the same with the retraction of said bar to its normal position, and means to cushion the ejector-bars as the same are retracted, substantially as described.

21. The combination in a type-assembling machine with appropriate type-reservoirs, of ejector-bars suitably mounted to reciprocate in ways to eject the type from the reservoirs, said bars being provided with suitable shoulders, key-levers operated from a keyboard, a revolving ejector-blade normally rotating, the key-levers adapted to give to the ejector-bars an initial projecting movement sufficient to bring into the path of said revolving blade, an appropriate shoulder of said ejector-bar by which engagement the ejector-bar is projected to eject the type, a spring-trigger adapted to engage a shoulder of said ejector-bar as the same is projected, and to retract the ejector-bar when the same is released from engagement with the ejector-revolving blade, means operated by the initial movement of the key-levers to unlock the ejector-bars, and to lock the same automatically as said bars are returned to their normal position, and a loaded cushion-bar interposed between the abutting ends of said ejector-bars and an inclined plane, substantially as described.

22. In a type-assembling machine wherein type-bars are projected and retracted to eject the type from suitable reservoirs, the combination of such ejector-bars with an inclined plane, and a cushion-bar interposed between the abutting ends of said ejector-bars, and said inclined plane to receive and cushion the movement of said bars as they are retracted, substantially as described.

23. The combination in a type-assembling machine wherein a shoulder of an ejector-bar is engaged by a revolving projector-blade, a cushion-bar suitably supported in elastic supports beneath said ejector-bars to normally support said bars in their projecting or retracting movement and adapted to yield to an abnormal depressing force incident to the engagement of the projecting blade and the shoulder with which it is engaged, substantially as described.

24. The combination in a type-assembling machine, of an appropriate type-reservoir, having a plurality of type-cases, type-ejector bars suitably mounted to eject the type, one of said bars operating on the type in each case, a key-lever operated from a keyboard to impart to one of a plurality of said ejector-bars an initial movement, said key-lever having also a lateral movement, a rock-shaft suitably mounted and carrying a crank-arm, with guide-pins to receive one end of said key-lever, and means to rock said shaft to bring said key-lever into operative position with reference to one of a plurality of said ejector-bars and means to lock said shaft, and means to move said lever laterally into a position when operated from a keyboard to engage one of said ejector-bars, substantially as described.

25. The combination in a type-assembling machine of a type-assembling table, type-reservoirs and type-ejector mechanism, the latter operating to eject the type from the reservoirs onto the table, a friction-bar suitably supported with reference to said table, and means controlled by the operation of the ejector mechanism in ejecting the type, to lift said friction-bar off the table a variable distance, according to the thickness of the type ejected, and means to cause said bar to bear on the type as the same is ejected and during its movement on the table with a pressure intended to operate as a restraining resistance as the type are ejected on the table or moved over the face thereof, substantially as described.

26. The combination in a type-assembling machine of a type-assembling table with a central type-channel, type-reservoirs, and type-ejector bars the latter operating to eject the type from the reservoirs onto the table, and type-drivers operating reciprocally and alternately to drive the type to the central channel, two friction-bars suitably supported with reference to said table, one on either side of the central channel, and means controlled by the operation of the ejector-bars in ejecting the type to lift said friction-bar off the table a variable distance, according to the thickness of the type ejected, and means to cause said bars to bear on the type as the same is ejected, and during its movement on the table with a pressure intended to operate as a restraining resistance as the type are ejected on the table or moved over the face thereof, substantially as described.

27. The combination in a type-assembling machine of an assembling-table with a central type-channel, two type-drivers suitably mounted on a reciprocating carrier to drive the type alternately to the central channel, two friction-bars suitably supported, one on either side of the central channel, and means to cause said bars to bear on the type with a restraining resistance during the movement of the type on the table, two dogs with abutting heads, mounted one in each of the adjacent ends of the friction-bars in suitable ways to move horizontally, to arrest the movement of the type at the central channel, and to continue the restraining resistance on the type to the full throw of the drivers, substantially as described.

28. The combination in a type-assembling machine of an assembling-table with a central type-channel, two type-drivers suitably mounted on a reciprocating carrier to drive the type alternately to the central channel, two friction-bars suitably supported, one on either side of the central channel, and means to cause said bars to bear on the type with a restraining resistance during the movement of the type on the table, two dogs with abutting heads mounted one in each of the adjacent ends of the friction-bars in suitable ways to move horizontally to arrest the movement of the type at the central channel, and to continue the restraining resistance on the type to the full throw of the drivers, and means to force the type delivered at the central channel into said channel, substantially as described.

29. In a type-assembling machine wherein type are assembled on an assembling-table, the combination of an assembling-table, type-reservoirs and ejector-bars, the latter operating to eject type from said reservoirs upon said table, a rocking frame suitably supported and carrying on one side a friction-bar, and on the other side contact-points to engage beveled shoulders of the ejector-bars, with a spring interposed to normally maintain the friction-bar in contact with the table, the contact-points being adjusted in relation to the shoulders of each ejector-bar to lift the friction-bar, with the operation of each ejector-bar, sufficiently, to permit the type controlled by said ejector-bar to pass between the friction-bar and the table, with a friction to operate as a restraining resistance upon the type, as the same is ejected onto or moved over the table, substantially as described.

30. In a type-assembling machine, an assembling-table provided with a central type-channel, in combination with suitable type-reservoirs and reciprocating ejector-bars, two rocking frames suitably supported on either side of the central channel, and carrying on one side of each a friction-bar, and on the other side of each contact-points to engage beveled shoulders of the ejector-bars, with a spring interposed to normally maintain the friction-bars in contact with the table, the contact-points being adjusted in relation to the shoulders of each ejector-bar to lift the friction-bars affected thereby with the operation of each ejector-bar, sufficiently, to permit the type controlled by said ejector-bar to pass between the friction-bar and the table, with a friction to operate as a restraining resistance upon the type as it is ejected, and during its movement over the table, two dogs with abutting heads, mounted one in each of the adjacent ends of the friction-bars, in suitable ways to move horizontally to arrest the movement of the type at the central channel, and to continue the restraining resistance on the type to the full throw of the drivers, and means to drive the type alternately to the central channel, and means to force the type into the central channel, substantially as described.

31. The combination in a type-assembling machine of an assembling-table with a central type-channel, suitable type-reservoirs and means to eject the type from said type-reservoirs onto the assembling-table, said ejector mechanism operating independently on either side of the central channel, two friction-bars suitably supported on either side of the central channel, and means controlled by the independent ejector mechanism, operating on either side of the central channel to control the movement of said independent friction-bars to cause each of said friction-bars to bear on the type ejected by the independent ejector mechanism as the type is ejected, and during its movement on the table with a pressure intended to operate as a restraining resistance to the movement of the type; type-drivers operating reciprocally and alternately to drive the type to the central channel, said drivers operating in harmony with the ejector mechanism to the end that the type are ejected when the drivers are withdrawn from the central channel, substantially as described.

32. The combination in a type-assembling machine of an assembling-table with a central type-channel and appropriate type-reservoirs, means to eject the type from said reservoirs onto the table operating independently on either side of the central channel, two friction-bars suitably supported one on either side of the central channel, means to cause said bars to bear on the type with a pressure intended to operate on the type with a restraining resistance as the type are ejected and during their movement on the table, means operated by the type-ejector mechanisms operating on one side of the central channel to control the movement of the friction-bar on the same side of the central channel, to lift said friction-bar off the table to receive the type as the same is ejected, and to operate upon the same with a restraining resistance as heretofore stated, and means operated by the type-ejector mechanism on the other side of the central channel to control the ejector-bar on the other side of the central channel, to lift the said bar off the table to receive the type as the same is ejected, and to operate upon the same as a restraining resistance as heretofore stated, type-drivers suitably mounted to operate reciprocally and alternately to drive the type to the central channel, said drivers operating in harmony with the ejector mechanism to the end that the type are ejected when the drivers are withdrawn from the central channel, substantially as described.

33. The combination in a type-assembling machine of a type-assembling table provided with a centrally-located type-channel, two type-drivers operating alternately from either side of the type-channel to drive the type delivered on the table to said central channel, means to eject the type on the table, two friction-bars suitably mounted one on either side of the central channel to operate independently, means to cause said bars to bear on the type with a restraining resistance during the movement of the type on the table, means operated by the ejector mechanism to lift said friction-bars according to the thickness of the type ejected, the adjustment and operative relation of the parts being such that the friction-bars act alternately and harmoniously in relation to the ejector and driving mechanism, substantially as described.

34. The combination in a type-assembling machine of an assembling-table with a centrally-located type-channel, two type-drivers operating alternately from either side of the type-channel to drive the type delivered on the table to said central type-channel, appropriate type-reservoirs, two friction-bars suitably supported one on either side of the central channel, and means to cause said bars to bear on the type with a restraining resistance as they are ejected on the table, and during their movement on the table, said pressure being controlled by the movement of the ejector-bars; means to arrest the movement of the type at the central channel, means to eject the type from the reservoirs, operating alternately when the type-drivers are at the most distant point in the extremity of their movement from the central channel, substantially as described.

35. The combination in a type-assembling machine of an assembling-table, with a centrally-located type-channel, two type-drivers operating alternately from either side of the type-channel to drive the type delivered on the table to said central type-channel, appropriate type-reservoirs suitably mounted in the assembling-table to maintain the type in columns with the base of said columns in the plane of the surface of the table, a friction-bar suitably supported with reference to said table, means controlled by the operation of ejector-bars in ejecting the type upon the table to lift said friction-bar off the table a variable distance according to the thickness of the type ejected, and means to cause said bar to bear on the type as the same is ejected, and during its movement on the table with a pressure to operate as a restraining resistance, as the type are ejected on the table or moved over the face thereof, means to arrest the movement of the type at the central channel, ejector-bars suitably mounted to reciprocate in ways to eject the type from the reservoir, means operating from the keyboard to move said ejector-bars into position to be operated upon by automatically-operated ejector-blades, said blades being arranged to engage the ejector-bars, when the drivers are at the most distant point in the extremity of their movement from the central channel, substantially as described.

36. The combination in a type-assembling machine of a type-assembling table with centrally-located type-channel, suitable type-reservoirs, and two type-drivers suitably mounted at either end of a reciprocating carrier, with means to reciprocate said carrier, two friction-bars suitably supported, one on either side of the central channel, and means to cause said bars to bear on the type, with a restraining resistance during the movement on the table, controlled by the movement of the ejector-bars, two dogs with abutting heads mounted one in each of the adjacent ends of the friction-bars in suitable ways to move horizontally to shift from side to side of the central channel, as they are engaged by the type forced against the same by the type-drivers to arrest the movement of the type at the central channel, operating automatically as each type is delivered at the central channel, ejector-bars suitably mounted to reciprocate in ways to eject the type from the reservoir, and means operating from a keyboard to move the ejector-bars into position to be operated upon by automatically-operated ejector-blades, said blades being arranged to engage the ejector-bars when the drivers are at the most distant point in the extremity of their movement from the central channel, substantially as described.

37. The combination in a type-assembling machine of an assembling-table with a centrally-located type-channel, suitable type-reservoirs adapted to fit into an appropriate aperture in said table so that the base of the columns of type supported in the type-reservoirs shall be in the plane of the surface of said table, two type-drivers as thin as the thinnest type, each suitably supported between a bifurcated frame, a reciprocating carrier with brackets at each end thereof, and one of said bifurcated frames carrying said type-drivers mounted in horizontal ways on each of said brackets, with a spring interposed between the frames and their brackets, two rocking frames suitably supported and carrying on one side of each a friction-bar, and on the other side of each contact-points to engage the beveled shoulders of ejector-bars, with a spring interposed to normally maintain the friction-bars in contact with the assembling-table, the contact-points being adjusted in relation to the shoulders of each ejector-bar to lift the friction-bar with the operation of each ejector-bar sufficiently, to permit the type controlled by each ejector-bar to pass between the friction-bar and the table, with a friction to operate as a restraining resistance, two dogs with abutting heads mounted one on each of the adjacent ends of the friction-bar in suitable ways to move horizontally to arrest the movement of the type at the central channel, said friction-bars being arranged to pass between the walls of the bifurcated frames supporting the type-drivers, ejector-bars suitably mounted to reciprocate in ways to eject the type from the reservoirs, said bars being provided with suitable shoulders, key-levers operating from a keyboard to give to the ejector-bars an initial ejecting movement by engaging one of the shoulders of said bars, two ejector-blades mounted on a normally-rotating shaft on opposite sides of the plane of its axis, one of these blades adjusted to engage the shoulder of the ejector-bars operating on one side of the central channel, and the other blade operating on the other side of the central channel, when said shoulders are brought into the path of said blades by said initial movement, and a spring-trigger arranged to engage said ejector-bars when the same are projected, and to retract the same when they are released from the operation of the rotating ejector-blades, the ejector-blades being arranged to engage the ejector-bars to eject the type on each side of the table, when the type-driver operating on that side of the table is at the extremity of its movement from the central channel, a rocking lever suitably mounted, and provided at one end with a bifurcated type-forcer to force the type into the central channel, and means to rock said lever at the instant that each type-driver arrives at the type-channel, substantially as described.

38. The combination in a type-assembling machine of an assembling-table, with a centrally-located type-channel, suitable type-reservoirs adapted to fit into an appropriate aperture in said table so that the base of the columns of type supported in the type-reservoirs shall be in the plane of the surface of said table, two type-drivers as thin as the thinnest type, each suitably supported between a bifurcated frame, a reciprocating carrier with brackets at each end thereof, and one of said bifurcated frames carrying said type-drivers mounted in horizontal ways on each of said brackets, with a spring interposed between the frames and their brackets, and means to adjust the throw of the drivers with reference to the central channel, two rocking frames suitably supported and carrying on one side of each a friction-bar, and on the other side of each contact-points to engage the beveled shoulders of ejector-bars, with a spring interposed to normally maintain the friction-bars in contact with the assembling-table, the contact-points being adjusted in relation to the shoulders of each ejector-bar to lift the friction-bar with the operation of each ejector-bar sufficiently to permit the type controlled by said ejector-bar to pass between the friction-bar and the table, with a friction to operate as a restraining resistance, two dogs with abutting heads, mounted one on each of the adjacent ends of the friction-bar in suitable ways to move horizontally to arrest the movement of the type at the central channel, and to continue the resistance, said friction-bars being arranged to pass between the walls of the bifurcated frames supporting the type-drivers, ejector-bars suitably mounted to reciprocate in ways to eject the type from the reservoirs, said bars being provided with suitable shoulders, key-levers operating from a keyboard to give to the ejector-bars an initial ejecting movement by engaging one of the shoulders of said bars, two ejector-blades mounted on a normally-rotating shaft on opposite sides of the plane of its axis, one of these blades adjusted to engage the shoulder of the ejector-bars on one side of the central channel, and the other blade operating on the other side of the central channel, when said shoulders are brought into the path of said ejector-blades by said initial movement, and a spring-trigger arranged to engage said ejector-bars when the same are projected, and to retract the same when they are released from the operation of the rotating ejector-blades, the ejector-blades being arranged to engage the ejector-bars to eject the type on each side of the table, when the type-driver operating on that side of the table is at the extremity of its movement from the central channel, a rocking lever suitably mounted and provided at one end with a bifurcated type-forcer to force the type into the central channel, and means to rock said lever at the instant that each type-driver arrives at the type-channel, substantially as described.

39. The combination in a type-assembling machine of an assembling-table with a centrally-located type-channel, suitable type-reservoirs adapted to fit into an appropriate aperture in said table so that the base of the columns of type supported in the type-reservoirs shall be in the plane of the surface of said table, two type-drivers as thin as the thinnest type, each suitably supported between a bifurcated frame, a reciprocating carrier with brackets at either end thereof, and one of said bifurcated frames carrying said type-drivers mounted in horizontal ways in each of said brackets, said brackets and frames secured together by an adjustment-screw, with a spring interposed between the frames and their brackets, two rocking frames suitably supported and carrying on one side of each a friction-bar, and on the other side of each contact-points to engage the beveled shoulders of ejector-bars, with a spring interposed to normally maintain the friction-bars in contact with the assembling-table, the contact-points being adjusted in relation to the shoulder of each ejector-bar to lift the friction-bar with the operation of each ejector-bar sufficiently to permit the type controlled by said ejector-bar to pass between the friction-bar and the table, with a friction to operate as a restraining resistance, two dogs with abutting heads mounted one on each of the adjacent ends of the friction-bar in suitable ways to move horizontally to arrest the movement of the type at the central channel, and to continue the restraining resistance on the type, until the same are forced into the central channel, said friction-bars being arranged to pass between the walls of the bifurcated frame supporting the type-drivers, ejector-bars suitably mounted to reciprocate in ways to eject the type from the reservoirs, said bars being provided with suitable shoulders, key-levers operating from a keyboard to give to the ejector-bars an initial ejecting movement by engaging one of the shoulders of said bars, a locking-bolt mounted on a lever secured to an arm of the key-lever, and a recess to coöperate with said locking-bolt in each ejector-bar, two ejector-blades mounted on a normally-rotating shaft on opposite sides of the plane of its axis, one of these blades adjusted to engage the shoulder of the ejector-bars, operating on one side of the central channel, and the other blade operating on the other side of the central channel, when said shoulders are brought into the path of said ejector-blades by said initial movement, and a spring-trigger arranged to engage said ejector-bars when the same are projected, and to retract the same when they are released from the operation of the rotating ejector-blades, the ejector-blades being arranged to engage the ejector-bars to eject the type on each side of the table, when the type-driver operating on that side of the table is at the extremity of its movement from the central channel, a rocking lever suitably mounted, and provided at one end with a bifurcated type-forcer to force the type into the central channel, and means to rock said lever at the instant that each type-driver arrives at the type-channel, a loaded cushion-bar interposed between the abutting ends of the ejector-bars and an inclined plane, the rear end of said ejector-bars being supported by appropriate springs, substantially as described.

In testimony that I claim the foregoing as my invention I have signed my name, in presence of two witnesses, this 30th day of July, 1896.

ALEXANDER DOW.

Witnesses:
L. DOW,
C. N. CRONYN.